United States Patent
Sano et al.

(10) Patent No.: US 7,027,186 B2
(45) Date of Patent: Apr. 11, 2006

(54) METHOD FOR EVALUATING REPRODUCIBILITY OF TONING SAMPLE BY CCM

(75) Inventors: Kazuo Sano, Tokyo (JP); Fumiyoshi Saito, Tokyo (JP); Yasaku Watanabe, Tokyo (JP); Eiko Fujiyama, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 857 days.

(21) Appl. No.: 09/926,359

(22) PCT Filed: Feb. 22, 2001

(86) PCT No.: PCT/JP01/01316

§ 371 (c)(1),
(2), (4) Date: Oct. 22, 2001

(87) PCT Pub. No.: WO01/63229

PCT Pub. Date: Aug. 30, 2001

(65) Prior Publication Data

US 2003/0234931 A1 Dec. 25, 2003

(30) Foreign Application Priority Data

Feb. 23, 2000 (JP) ............... 2000-045604

(51) Int. Cl.
*G03F 3/08* (2006.01)
(52) U.S. Cl. ............... 358/1.9; 358/406; 358/504; 358/518
(58) Field of Classification Search ............... 356/402, 356/405, 406, 407, 408, 421, 425; 358/1.9, 358/406, 504, 518
See application file for complete search history.

(56) References Cited

U.S. PATENT DOCUMENTS 5,740,079 A * 4/1998 Shigemori et al. .......... 356/402

FOREIGN PATENT DOCUMENTS

JP 11-271144 10/1999

* cited by examiner

*Primary Examiner*—Thomas D. Lee
(74) *Attorney, Agent, or Firm*—Oblon, Spivak, McClelland, Maier & Neustadt, P.C.

(57) ABSTRACT

Under the conditions that there are 2 or more samples produced in a CCM toning or visual toning process by which colors are adapted to the target color and respective components such as a coloring agent defining the sample color are registered in a CCM system, the reproducibility of the samples is evaluated based on the difference $\Delta R\text{-}n$ (n denotes a sample number) between spectral reflectance $RST\text{-}n$ obtained by actually measuring the respective samples and spectral reflectance $RPR\text{-}n$ obtained by the CCM simulation corresponding to the coloring agent recipe for the sample color at the same n, and determination whether toning work should be continued or not is rapidly and simply performed. On the other hand, when an abnormal sample is perceived, the difference $\Delta R'\text{-}b$ of the sample obtained from the specified equations is determined and, by comparison of the difference between the target color and a color of a toning sample in the color matching process, components such as a coloring agent mixed into the abnormal sample is presumed and its mixed amount is presumed.

10 Claims, 7 Drawing Sheets

METHOD FOR EVALUATING REPRODUCIBILITY OF TONING SAMPLE BY CCM

TECHNICAL FIELD

The present invention relates to a method for evaluating the reproducibility of colors derived from a sample color producing process (coloring process) regarding a 2 or more different color samples having different coloring agent recipes produced by CCM toning or visual toning by which colors are adapted to the target color, using the CCM techniques.

BACKGROUND TECHNIQUES

In a toning process for adapting colors to a target color presented by the instructions of customers is usually performed via production of around 3 different color samples in the case of CCM toning, or via production of an around 3 to 5 different color samples in the case of visual toning. Regarding precision on CCM by which simulated color is matched to the target color, when CCM correction toning is effected, the color difference is gradually decreased necessarily and, finally, the target sample can be almost reproduced. However, in a coloring process in which a colored product is obtained based on the color mixing determined by CCM toning or visual toning, there arises a problem on the reproducibility in a coloring step due to the influence of the measuring error or the use of poor color reproducibility agents or the like. When the reproducibility in a coloring step including the measuring error or the like is deteriorated, the color difference is not converged beyond that reproducibility. When colors of a colored product (final sample numbered product) produced according to CCM or visual color matching are not consistent with the target color, there is a problem on the reproducibility in many cases.

Previously, when the reproducibility of colors in a coloring step is examined, for example, when the reproducibility is examined on sample No. 3 among a 5 samples group, the sample color has to be produced a few times based on the relevant color mixing. In addition, when there is no problem regarding the reproducibility of sample No.3, the similar examination has to be further performed on other sample No. product for which kinds of coloring agents are the same but their mixing rate is different.

However, the production of a sample for confirmation of the reproducibility in the toning work is laborious in the sample production and is actually impossible in respect of the efficiency. For that reason, if the results of the actually measured color difference of a sample product produced in a toning process such as CCM toning or visual toning as well as the reproducibility are rapidly and simultaneously displayed on a computer screen, determination whether toning is to be continued or toning should be stopped can be done earlier and, at the same time, materials for determining the strategy can be obtained, being advantageous. In addition, when there is a problem on the reproducibility of the development of a particular coloring agent, if what coloring agent is mixed to what extent is known, the cause can be investigated and, at the same time, the production efficiency can be enhanced, being advantageous.

Therefore, an object of the present invention is to provide a method for evaluating the reproducibility of a toning sample, which can rapidly and simply perform determination whether the toning work is to be continued or not, by displaying the actually measured color difference of a sample product produced in a toning process such as CCM toning and visual toning and the reproducibility. Another object of the present invention is to provide a method for presuming a component such as a coloring agent mixed into a toning sample, when the abnormal sample is perceived in the method for evaluating the reproducibility of the sample, and a method for presuming its mixed amount.

SUMMARY OF THE INVENTION

Under such the circumstances, the present inventors studied intensively and, as a result, we found that (1) under the conditions that there are 2 or more sample groups produced in a CCM toning or visual toning process by which colors are adapted to the target colors and respective components such as a coloring agent defining the sample color are registered in a CCM system, spectral reflectance RPR–n can be calculated beyond simulation corresponding to each colors mixing (each toning sample), and difference between the RPR–n and the actually measured spectral reflectance RST–n at the same –n becomes a simulation error of CCM and, usually, since toning is performed mainly by fine correction to the target colors in a narrow range in a color space, the CCM simulation error in a toning sample group becomes constant and, therefore, when the difference between RST–n and RPR–n is not constant, it can be determined that the reproducibility of colors derived from a coloring step (sample production) is deteriorated, (2) when an abnormal sample is observed in the method for evaluating the reproducibility of a toning sample, the difference $\Delta R'-b$ of the sample obtained from a particular equation is determined, and compared with the difference $\Delta R'-m$ based on a toning sample derived from the CCM simulation by which colors are adapted to the target colors and, whereby, a component such as a coloring agent which has mixed into the sample can be presumed and its mixed amount can be presumed, which resulted in completion of the present invention.

That is, the present invention (1) provides a method for evaluating the reproducibility of a toning sample by CCM, which comprises, under the conditions that there are 2 or more samples produced in a CCM toning or visual toning process by which colors are adapted to a target color and respective components such as a coloring agent defining the sample color are registered in a CCM system, evaluating the reproducibility of the samples based on the difference $\Delta R-n$ (n denotes a sample number) between spectral reflectance RST–n obtained by actually measuring the respective sample and spectral reflectance RPR–n obtained by the CCM simulation corresponding to the coloring agent recipe for the sample at the same n.

In addition, the present invention (2) provides a method for evaluating the reproducibility of a toning sample by CCM, which comprises, under the conditions that there are 2 or more samples produced in a CCM toning or visual toning process by which colors are adapted to a target color and respective components such as a coloring agent defining the sample color are registered in a CCM system, evaluating the reproducibility of the samples based on the difference $\Delta T-n$ (n denotes a sample number) between spectral transmittance TST–n obtained by actually measuring the respective sample and spectral transmittance TPR–n obtained by the CCM simulation corresponding to coloring agent recipes for the sample color at the same n.

In addition, the present invention (3) provides a method for evaluating the reproducibility of a toning sample by CCM according to the above (1), wherein evaluation of the reproducibility of the samples is performed from the difference between either of n for $\Delta R-n$, or an average for $\Delta R-n$ and the $\Delta R-n$.

In addition, the present invention (4) provides a method for evaluating the reproducibility of a toning sample by CCM according to the above (2), wherein evaluation of the reproducibility of the samples is performed from the difference between either of n for $\Delta T-n$, or an average for $\Delta T-n$ and the $\Delta T-n$.

In addition, the present invention (5) provides a method for evaluating the reproducibility of a toning sample by CCM according to any one of the above (1)–(4), wherein evaluation is performed based on the difference of color specification value such as $\Delta L^*a^*b^*$ corresponding to the difference of spectral reflectance $\Delta R-n$ or the difference of spectral transmittance $\Delta T-n$, statistical value such as maximum, minimum and standard deviation of the difference of color specification value and the color difference as well as the color difference calculated from the statistical value.

In addition, the present invention (6) provides a method for evaluating the reproducibility of a toning sample by CCM, which comprises incorporating the method for evaluating the reproducibility of a toning sample as defined in the above (5) into a CCM software and calculating the coloring agent recipes of the samples by CCM toning and, thereby, the reproducibility can be confirmed.

In addition, the present invention (7) provides a method for evaluating a toning sample, which comprises, in a method for evaluating the reproducibility of a toning sample by CCM system, under the conditions that there are 2 or more samples produced in a CCM toning or visual toning process by which colors are adapted to a target color and respective components such as a coloring agent defining the sample color are registered in a CCM system, based on the difference $\Delta R-n$ (n denotes a sample number) between spectral reflectance $RST-n$ obtained by actually measuring the respective samples and spectral reflectance $RPR-n$ obtained by the CCM simulation corresponding to the coloring agent recipes for the samples at the same n, extracting a sample indicating the abnormal value $\Delta R-b$ (b means bad) different from others among $\Delta R-n$ of the samples, and presuming components such as a coloring agent mixed in the sample indicating the abnormal value or presuming its mixed amount via the following respective steps;

(1) a step of calculating either of n except for b among the $\Delta R-n$ or an average of $\Delta R-n$ except for b, wherein actually measured spectral reflectance of a sample indicating the abnormal value is $RST-b$ and spectral reflectance obtained by CCM simulation corresponding to the coloring agent recipe is $RPR-b$; (2) a step of adding a calculated value obtained in the above (1) to spectral reflectance $RPR-b$ by CCM system to obtain corrected provisional true value $RST'-b$; (3) a step of determining the difference $\Delta R'-b$ between the provisional true value $RST'-b$ and actually measured spectral reflectance $RST-b$; (4) a step of, using (actually measured spectral reflectance $RST-b-\Delta R-ave$) value as a corrected target color, obtaining spectral reflectance $RPR-m$ obtained by simulation from the existing CCM data for toning to the corrected target color, and obtaining the difference $\Delta R-m$ between the simulated spectral reflectance $RPR-m$ and the simulated spectral reflectance $RPR-b$ by CCM system; (5) a step of determining the difference $\Delta R-m$ so that the difference between the $\Delta R'-b$ and the difference $\Delta R-m$ becomes minimum.

In addition, the present invention (8) provides a method for evaluating a toning sample, wherein said method is performed using spectral transmittance $\Delta T-n$ instead of spectral reflectance $\Delta R-n$ in the invention described in the above (7) and, in addition, the present invention (9) provides the method for evaluating a toning sample according to the above (7) or (8), wherein the difference of color specification value or color difference obtained based on the difference $\Delta R-n$ is used in place of the above difference $\Delta R-n$, or the difference of color specification value or color difference obtained based on the difference $\Delta T-n$ is used in place of the $\Delta T-n$.

THE BEST MODE FOR CARRYING OUT THE INVENTION

Figure 1:
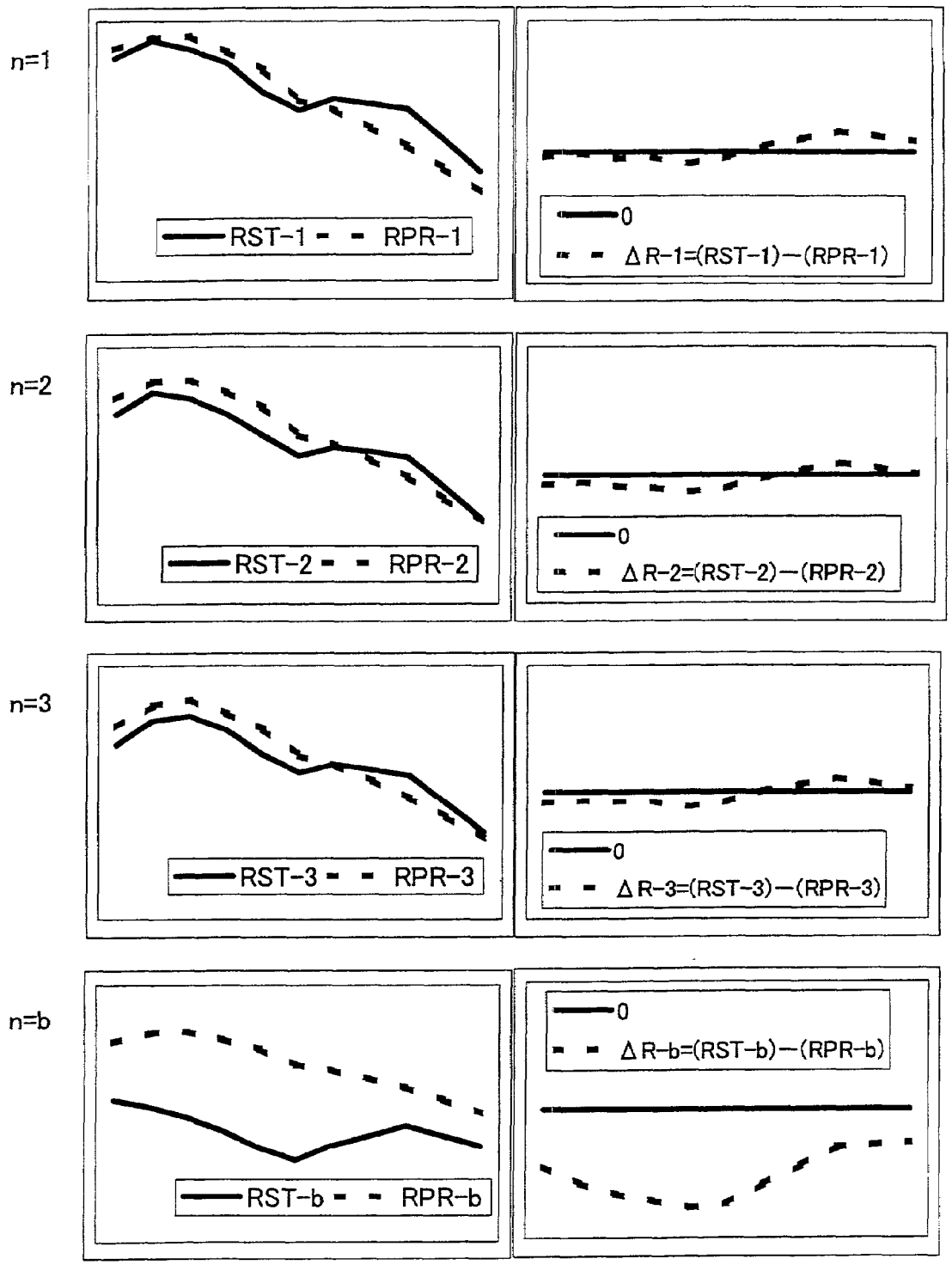
FIG. 1 is a view showing the relationship between spectral reflectance $RST-n$ obtained by actual measurement in the samples and simulated spectral reflectance $RPR-n$ obtained by CCM system (left side) and the difference $\Delta R-n$ thereof (right side)

A method for evaluating the reproducibility which is the first invention is performed under the conditions that there are 2 or more samples produced in a CCM toning or visual toning process by which colors are adapted to the target color and respective components such as a coloring agent defining the sample color are registered in a CCM system.

In the present invention, toning such as CCM toning and visual toning is not particularly limited but includes various tonings such as new product toning by which colors are adapted to the target color presented by customers and correction toning of a lot product in production section. Performance of these tonings by CCM is CCM toning and performance by human visual sense is visual toning. In addition, the form of the target is not particularly limited as long as a product is a color agent mixed series colored product, but includes printed products, plastic molded articles, coated products and dyed products.

Explaining referring to CCM toning, for example, in the case of new product toning, spectral reflectance or spectral transmittance is obtained by actually measuring the target sample (since the similar effects or advantages are exerted in spectral reflectance or spectral transmittance in the present invention, explanation is effected using spectral reflectance hereinafter for convenience), the color agent recipe of the sample conforming to the spectral reflectance is obtained by CCM simulation. That is, a sample product is produced based on optical data (absorption coefficient and scattering coefficient) of a coloring agent which is registered in CCM, corrected products are successively produced based on spectral reflectance of an already toned product (n=last time product) and, finally, a sample product conforming to the target color, that is, spectral reflectance obtained by actually measuring the target sample is obtained. The number of sample products is around 2–3 in the case of a new product toning. Visual toning is carried out, for example, from production of the first sample to a final sample produced conforming to the target sample based on human visual sense. The number of such sample is around 3–5 in the case of a new produce toning.

Respective coloring agent recipe is present in each sample. Coloring agent recipe is determined, for example, by a ratio of blending components such as a substrate and a coloring agent. Therefore, actually measured spectral reflectance of each sample, that is, each of sample 1 (n=1), sample 2 (n=2), sample 3 (n=3) . . . and sample n (n=n) is naturally different. For this reason, even when spectral reflectance RST–ns obtained for every sample are compared, the reproducibility can not be compared. In addition, n means a sample number.

In the present invention, under the conditions that the aforementioned respective components are registered in CCM, each sample in a toning process is actually measured to obtain spectral reflectance in both CCM toning and visual toning. That is, when the sample number is 5, five kinds of spectral reflectance data are obtained. These are indicated, for example, by RST–1, RST–2 . . . , RST–5. Actually measured spectral reflectance RST–n may be measured by a spectrophotometer. In addition, since respective components are registered in CCM system, spectral reflectance RPR–ns of CCM simulation corresponding to coloring agent recipes of respective samples are obtained. These are indicated, for example, by RPR–1, RPR–2 . . . , RPR–n.

Simulated spectral reflectance RPR–n is obtained by the CCM theory in the CCM system. The CCM theory is different depending upon the form of a subject to be toned. When a subject to be toned is translucent or opaque, Kubelka-Munk theory is applied. In the case of printing or dyeing, the 1 constant method of Kubelka-Munk theory is suitable and, in the case of coating or plastic, the 2 constant method of Kubelka-Munk theory is suitable. When a subject is transparent, Lambert Beer theory is applied.

There are many methods to which Kubelka-Munk theory are applied, a representative of which is explained herein. Kubelka-Munk is represented by the equation (1).

$$K/S=(1-R)^2/2R \tag{1}$$

The equation (1) is reversely developed to obtain the equation (2).

$$R=1+(K/S)-((K/S)^2+2(K/S))^{1/2} \tag{2}$$

wherein, R denotes spectral reflectance of a subject to be toned, K denotes an absorption coefficient of a coloring agent, and S denotes a scattering coefficient.

In the case of the 1 constant method of Kubelka-Munk theory, a predetermined amount of each color (for example, red ink and blue ink) is weighed, spectral reflectance of a colored product having each color is measured, and a K/S function of a coloring agent, that is, $F_n$ is registered in advance from the equation (1). $F_n$ is indicated by the equation (3).

$$F_n=((K/S)_n-(K/S)_0)/C_n \tag{3}$$

wherein, $(K/S)_n$ denotes a K/S value obtained by the equation (1) from spectral reflectance of a colored product, $(K/S)$ denotes a K/S value of a product to be colored (for example, paper), $C_n$ denotes wt % of a coloring agent, $F_n$ denotes a K/S value harbored by a coloring agent itself per color unit wt %, and n denotes a color name.

When a plurality of coloring agents are mixed and the mixed color affords a colored product, a (K/S)mix value is calculated according to the equation (4).

$$(K/S)\text{mix}=F_1C_1+ \ldots F_nC_n+(K/S)_0 \tag{4}$$

Since coloring agent recipe of a toning product is known, $C_n$ in the equation (4) is known and, since $F_n$ and $(K/S)_0$ are registered in a CCM system in advance, (K/S)mix of a toning product is obtained. (K/S)mix is substituted for K/S in the equation (2), and simulated spectral reflectance RPR–n is obtained by CCM system.

In the case of the 2 constants method of Kubelka-Munk theory, the equation (5) of Dunkan is applied in a mixed color.

$$(K/S)\text{mix}=(K_1C_1+ \ldots K_nC_n+K_0)/(S_1C_1+ \ldots +S_nC_n+S_0) \tag{5}$$

wherein, $K_n$ denotes an absorption coefficient of each coloring agent, $S_n$ denotes a scattering coefficient, $C_n$ denotes wt %, $K_o$ denotes an absorption coefficient of a product to be colored (for example, resin), and $S_0$ denotes its scattering coefficient.

The equation (5) is developed into the equation (6) using the particular pigment such as white a as a reference and other colors as a value relative to the reference.

$$(K/S)\text{mix}=\Sigma(K_n/S_n)(S_n/S_a)C_n+ \ldots +(K_o/S_o)(S_o/S_a)/(\Sigma(S_n/S_a)C_n+ \ldots +S_o/S_a) \tag{6}$$

wherein, $K_n/S_n$ denotes a K/S value obtained from the equation (1) by measuring spectral reflectance of product that is colored by each coloring agent, $K_0/S_0$ denotes a K/S value obtained from the equation (1) by measuring a product to be colored (for example, resin), $S_n/S_a$ denotes a relative scattering coefficient of each coloring agent relative to white a, and $S_0/S_a$ denotes a relative scattering coefficient of a product to be colored relative to white a. These values are registered in a CCM system in advance.

Since coloring agent recipe of a toning product is known, $C_n$ in the equation (6) is known and, since others are registered in a CCM system as described above, (K/S)mix of a toning product is obtained. And, (K/S)mix is substituted for K/S in the equation (2) and simulated spectral reflectance RPR–n is obtained by CCM system.

When a subject to be toned is transparent, the theoretical equation (7) of Lambert Beer is used.

$$D=-\text{Log } T \tag{7}$$

A predetermined amount of each coloring agent is weighed, spectral transmittance of a colored product is measured at that color, and a D function of each coloring agent, that is, $D_n$ is registered in advance from the equation (7). The D value ($D_n$) harbored by a coloring agent itself per color unit wt % is represented by the equation (8).

$$D_n = (-\text{Log } T_n + \text{Log } T_0)/C_n \tag{8}$$

wherein, $T_n$ denotes spectral transmittance of a colored product of each coloring agent, $T_0$ denotes spectral transmittance of a product to be colored (for example, resin), and n denotes a color name.

A plurality of coloring agents are mixed, and a D value of a colored product with the mixed coloring agents is calculated by the equation (9).

$$D\text{mix} = D_1 C_1 + \ldots + D_n C_n + D_0 \tag{9}$$

Since coloring agent recipe of a toning product is known, $C_n$ in the equation (9) is known and, since $D_n$ is registered in a CCM system in advance, Dmix of a toning product is obtained. Dmix is substituted for D in the equation (7), and simulated spectral transmittance TPR-n is obtained by the CCM system.

The aforementioned 1 constant method of Kubelka-Munk theory, 2 constants method of Kubelka-Munk theory and Lambert Beer method are techniques for CCM simulation, and one example of the procedure obtaining simulated spectral reflectance RPR-n and simulated spectral transmittance TPR-n by the CCM system.

In the method for evaluating the reproducibility of the present invention, evaluation of the reproducibility of the samples is performed based on the difference ΔR-n between spectral reflectance RST-n obtained by actually measuring the each sample color and simulated spectral reflectance RPR-n corresponding to coloring agent recipe for the sample color at the same n, or the difference ΔT-n between spectral transmittance TST-n and spectral transmittance TPR-n at the same n. The difference between RST-n and RPR-n at the same-n denotes CCM simulation error. Usually, since toning is performed mainly by fine correction to the target color in a narrow range in a color space, CCM simulation error in a toning sample may be considered to be constant. For that reason, the differences between RST-n and corresponding RPR-n are compared, and the reproducibility of colors is determined.

According to the present invention, the difference may be, in addition to the foregoing, the difference between either of n for ΔR-n, an average for ΔR-n or and the ΔR-n, or the difference between either of n for ΔT-n, or an average for ΔT-n and the ΔT-n and, further, the evaluation of the reproducibility may be performed based on the difference of color specification value such as ΔL*a*b* corresponding to the difference of spectral reflectance ΔR-n or the difference of spectral transmittance ΔT-n and the color difference, or statistical values such as maximum, minimum and standard deviation of the difference of color specification value such as ΔL*a*b*, and the color difference calculated from the statistical values. As a method for comparing the differences, there are a method of displaying the difference curves at upper and lower sides or left and right sides, a method of displaying by overlaying the difference curves and a method of displaying the difference of the difference of spectral reflectance.

In the method for evaluating the reproducibility of the present invention, the aforementioned method for evaluating the reproducibility of a toning sample is incorporated into a CCM software and coloring agent recipe of the sample by CCM toning is calculated by CCM system and, thereby, the reproducibility can be confirmed by a computer screen of a CCM system and, at the same time, whether toning work is to be continued or not can be determined by this display of the reproducibility. For example, when (maximum-minimum) for the difference of color specification value indicated by the aforementioned ΔL*a*b* for evaluating the reproducibility obtained from samples is compared with the actually measured the difference of color specification value between the target sample and a toning last time product, usually dividing into L* and a*b* of L*a*b* color system displayed in a color space, L* is displayed in an ordinate axis having a midpoint of an actually measured point for the target sample and a*b* is displayed in a circular graph having a midpoint of an actually measured point for the target sample on a computer screen. Since this display indicates ΔL*a*b* for a toning last time product represented by plotting in a positional relationship with the target color, when actually measured plotting for a toning last time product is in a range of the aforementioned (maximum-minimum) for ΔL*a*b* for evaluating the reproducibility, it can be determined that further correction is impossible and toning should be stopped. In addition, when the last time plotting is outside the aforementioned (maximum-minimum) range, it can be determined that correction is still possible and toning should be continued. The last time product refers to an immediate prior product upon toning work.

Figure 2:
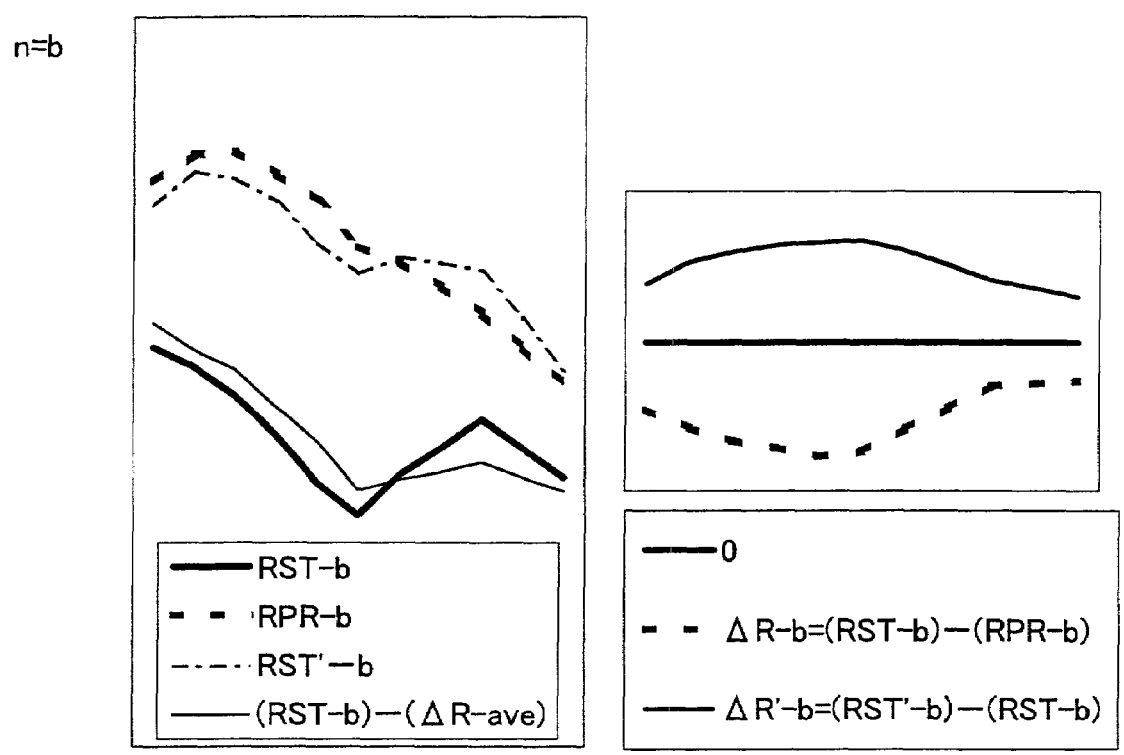
FIG. 2 is a view for explaining the case where n=b in FIG. 1.

The method for evaluating a toning sample which is the second invention will be explained referring to FIG. 1 and FIG. 2. FIG. 1 shows the relationship between spectral reflectance RST-n obtained by actual measuring and simulated spectral reflectance RPR-n obtained by CCM system (left side) and its difference ΔR-n (right side) in sample groups, and FIG. 2 is a view for explaining the case where n=b in FIG. 1. In figures, sample (n is represented by b) indicating the abnormal value ΔR-b (b means bad) different from others among sample group ΔR-1 to ΔR-4 is extracted. The extracting method is performed by comparing the difference ΔR-n=RST-n-RPR-n between RST-n and corresponding RPR-n as described above and, in this example, whereas ΔR-1, ΔR-2 and ΔR-3 are almost the same, ΔR-4 is remote from variance of ΔR for the aforementioned n=1 to 3 and this is regarded as an abnormal product. The abnormal product refers to a product specifically remote from variance for ΔR in ΔR-n in the case where there are n already toned products. Next, each step will be explained.

A (1) step is a step of calculating either of n expect for b among the ΔR-n, or an average for ΔR-n expect for ΔR-b (ΔR-ave), wherein actually measured spectral reflectance of a sample color indicating the abnormal value is RST-b, and simulated spectral reflectance obtained by CCM system corresponding to coloring agent recipe is RPR-b. The difference between actually measured spectral reflectance RST-b and simulated spectral reflectance RPR-b obtained by CCM system indicates the first time precision for CCM and, in a color range of a toning process extent for the same material, for example, in a range of 1 to 5 in terms of color difference, the difference is considered to be constant. For example, in the case of high chroma color or dark color at a small amount of titanium oxide, the difference is not constant in some cases. However, in this case, it is preferable that spectral reflectance of the sample and coloring agent recipes near to these are input in advance and the predicted precision is enhanced.

A (2) step is a step of adding a calculated value obtained in the aforementioned (1) step to simulated spectral reflectance RPR–b by CCM system to obtain corrected provisional true value RST'–b as shown in following equation (10).

$$\text{Provisional true value } RST'\text{-}b = RPR\text{-}b + \Delta R\text{-ave} \quad (10)$$

wherein, $\Delta R$–ave=$1/n\Sigma(RST$–$n$–$RPR$–$n)$, provided that b is excluded.

That is, provisional true value RST'–b is provisional spectral reflectance in the case where a n=b sample is produced without error. A (3) step is a step of determining the difference $\Delta R'$–b between provisional true value RST'–b and actually measured spectral reflectance RST–b as shown in the following equation (11).

$$\Delta R'\text{-}b = RST'\text{-}b - RST\text{-}b \quad (11)$$

An extent of abnormality can be confirmed by this error $\Delta R'$–b and from which coloring agent this error is derived can be also presumed by the following method. In addition, when the above (10) is substituted for RST'–b in the equation (11), $$\Delta R'\text{-}b = RPR\text{-}b - (RST\text{-}b - \Delta R\text{-ave}) \quad (12)$$

is obtained, and this may be used as a standard equation for determining an abnormal coloring agent. Thereafter, $\Delta R'$–b represented by the equation (12) is also referred to as $\Delta R''$–b.

A step (4) is a step of, using (actually measured spectral reflectance RST–b–$\Delta R$–ave) value as a corrected target color, obtaining spectral reflectance RPR–m obtained by simulation from the existing CCM data for toning to the target color, and obtaining the difference $\Delta R$–m between the simulated spectral reflectance RPR–m and the spectral reflectance RPR–b by CCM system. RPR–m calculated from CCM data is obtained by inputting components such as a coloring agent in a computer in advance, and is output successively in the order of nearer to the target color. And, a step (5) is a step of determining the difference $\Delta R$–m so that the difference between the $\Delta R'$–b and the difference $\Delta R$–m becomes minimum. From this, a coloring agent mixed in a sample indicating the abnormal value can be presumed and its mixed amount can be presumed. When actually measured spectral reflectance RST–b as it is used as a target color, since the difference error between actually measured spectral reflectance and simulated spectral reflectance is existed, precise determination can not be done.

In a (4) step, RST–b is used as a target color, spectral reflectance RPR–m is obtained by simulation from the existing CCM data for toning to the target color, and the difference $\Delta R$–m between the spectral reflectance RPR–m and RST'–b may be obtained. When the cause for abnormality is due to a decreased amount of the particular coloring agent, amounts of coloring agents other than the particular coloring agent are increased and, when the cause for abnormality is due to an increased amount of the particular coloring agent, amounts of coloring agents other than the particular coloring agent are decreased.

In the aforementioned method for evaluating a toning sample, the difference $\Delta T$–n may be used in place of the aforementioned difference $\Delta R$–n and, in this case, spectral transmittance is used in place of spectral reflectance. In addition, even when the difference of color specification value or color difference obtained based on the difference $\Delta R$–n is used in place of the aforementioned difference $\Delta R$–n, or even when the difference of color specification value or color difference obtained based on the difference $\Delta T$–n is used in place of the aforementioned $\Delta T$–n, the similar results to those of the aforementioned method for evaluating toning samples can be obtained.

EXAMPLES

The following Examples further illustrate the present invention in more detail. For CCM simulation, the 2 constants method of Kubelka-Munk theory was used.

Examples 1

(Case I; Case Where a Dispersion-processed Coloring Agent is Used)

3toning samples were produced for the target color. Samples were produced by kneading a vinyl chloride resin composition (PVC resin compound) and dispersion-processed DA type coloring agent for PVC (manufactured by Dainichi-seika color & chemical MFG., Co., LTD.) at a kneading rate shown in Table 1 (unit is "gram"). Kneading was performed at a temperature of about 170° C. for 2 minutes using two heating rollers. After kneading, the predetermined molding processing was performed to obtain 3 kinds of samples.

TABLE 1

| | 1st Time | 2nd Time | 3rd Time |
|---|---|---|---|
| PVC resin compound | (n = 1) 100 | (n = 2) 100 | (n = 3) 100 |
| Coloring agent | | | |
| DA P4050 (White) | 0.8 | 0.75 | 0.75 |
| DA P4710 (Black) | 0.04 | 0.045 | 0.045 |
| DA P4420 (Yellow) | 0.10 | 0.10 | 0.11 |
| DA P4620 (Blue) | 0.06 | 0.06 | 0.055 |

Figure 3:
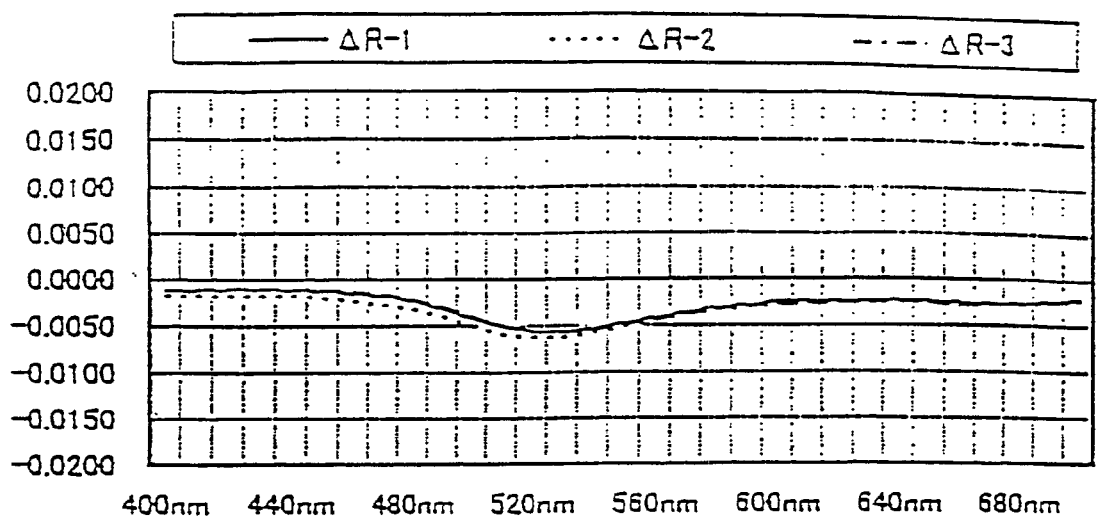
FIG. 3 is a view showing the difference ($\Delta R-n$) curve between actually measured spectral reflectance of a toning sample in Example 1 and simulated spectral reflectance by CCM system.
Figure 4:
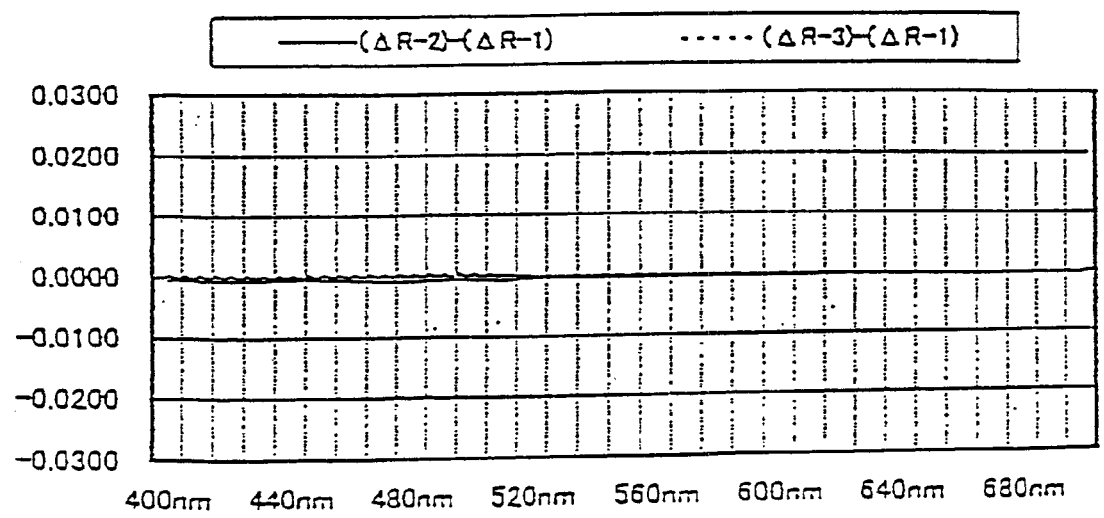
FIG. 4 is a view showing the difference curve for the difference between actually measured spectral reflectance of a toning sample and simulated spectral reflectance by CCM system.

The difference $\Delta R$–n between actually measured reflectance RST–n and simulated reflectance RPR–n for a toning sample according to the above formulation is shown in Table 2. The difference curves of spectral reflectance regarding to $\Delta R$–n in Table 2 is shown in FIG. 3, and the difference curves of spectral reflectance regarding to ($\Delta R2$–$\Delta R1$) and ($\Delta R3$–$\Delta R1$) are shown in FIG. 4. A transverse axis in FIG. 3 and FIG. 4 indicates wavelength, and an ordinate axis indicates the difference in spectral reflectance, respectively. For CCM simulation, "Colorcom CCM System" (manufactured by Dainichi-seika color & chemical MFG., Co., LTD.) was used, and spectral reflectance was obtained in a wavelength range of 400 to 700 nm.

TABLE 2

| | RST-1 | RST-2 | RST-3 | RPR-1 | RPR-2 | RPR-3 | $\Delta R$-1 | $\Delta R$-2 | $\Delta R$-3 |
|---|---|---|---|---|---|---|---|---|---|
| 400 nm | 0.1370 | 0.1284 | 0.1247 | 0.1383 | 0.1302 | 0.1257 | −0.0013 | −0.0018 | −0.0010 |
| 410 nm | 0.1351 | 0.1264 | 0.1224 | 0.1363 | 0.1282 | 0.1293 | −0.0012 | −0.0018 | −0.0009 |
| 420 nm | 0.1331 | 0.1244 | 0.1201 | 0.1342 | 0.1262 | 0.1209 | −0.0011 | −0.0018 | −0.0008 |
| 430 nm | 0.1331 | 0.1243 | 0.1199 | 0.1342 | 0.1261 | 0.1208 | −0.0011 | −0.0018 | −0.0009 |

TABLE 2-continued

| | RST-1 | RST-2 | RST-3 | RPR-1 | RPR-2 | RPR-3 | ΔR-1 | ΔR-2 | ΔR-3 |
|---|---|---|---|---|---|---|---|---|---|
| 440 nm | 0.1373 | 0.1282 | 0.1236 | 0.1385 | 0.1299 | 0.1245 | −0.0012 | −0.0017 | −0.0009 |
| 450 nm | 0.1433 | 0.1337 | 0.1291 | 0.1446 | 0.1357 | 0.1301 | −0.0013 | −0.0020 | −0.0010 |
| 460 nm | 0.1552 | 0.1446 | 0.1401 | 0.1568 | 0.1469 | 0.1413 | −0.0016 | −0.0023 | −0.0012 |
| 470 nm | 0.1699 | 0.1582 | 0.1539 | 0.1718 | 0.1609 | 0.1554 | −0.0019 | −0.0027 | −0.0015 |
| 480 nm | 0.1881 | 0.1749 | 0.1714 | 0.1905 | 0.1781 | 0.1735 | −0.0024 | −0.0032 | −0.0021 |
| 490 nm | 0.2086 | 0.1931 | 0.1905 | 0.2119 | 0.1971 | 0.1934 | −0.0033 | −0.0040 | −0.0029 |
| 500 nm | 0.2301 | 0.2120 | 0.2108 | 0.2344 | 0.2170 | 0.2148 | −0.0043 | −0.0050 | −0.0040 |
| 510 nm | 0.2447 | 0.2244 | 0.2249 | 0.2498 | 0.2303 | 0.2299 | −0.0051 | −0.0059 | −0.0050 |
| 520 nm | 0.2453 | 0.2246 | 0.2266 | 0.2509 | 0.2308 | 0.2322 | −0.0056 | −0.0062 | −0.0056 |
| 530 nm | 0.2342 | 0.2147 | 0.2179 | 0.2398 | 0.2209 | 0.2236 | −0.0056 | −0.0062 | −0.0057 |
| 540 nm | 0.2147 | 0.1975 | 0.2016 | 0.2200 | 0.2033 | 0.2070 | −0.0053 | −0.0058 | −0.0054 |
| 550 nm | 0.1889 | 0.1745 | 0.1794 | 0.1935 | 0.1797 | 0.1843 | −0.0046 | −0.0052 | −0.0049 |
| 560 nm | 0.1581 | 0.1461 | 0.1517 | 0.1622 | 0.1507 | 0.1562 | −0.0041 | −0.0046 | −0.0045 |
| 570 nm | 0.1315 | 0.1220 | 0.1276 | 0.1350 | 0.1259 | 0.1315 | −0.0035 | −0.0039 | −0.0039 |
| 580 nm | 0.1137 | 0.1057 | 0.1111 | 0.1167 | 0.1092 | 0.1145 | −0.0030 | −0.0035 | −0.0034 |
| 590 nm | 0.1037 | 0.0965 | 0.1017 | 0.1065 | 0.0997 | 0.1048 | −0.0028 | −0.0032 | −0.0031 |
| 600 nm | 0.0941 | 0.0876 | 0.0925 | 0.0965 | 0.0905 | 0.0954 | −0.0024 | −0.0029 | −0.0029 |
| 610 nm | 0.0888 | 0.0828 | 0.0874 | 0.0911 | 0.0855 | 0.0902 | −0.0023 | −0.0027 | −0.0028 |
| 620 nm | 0.0885 | 0.0828 | 0.0873 | 0.0909 | 0.0854 | 0.0900 | −0.0024 | −0.0026 | −0.0027 |
| 630 nm | 0.0875 | 0.0817 | 0.0862 | 0.0898 | 0.0842 | 0.0889 | −0.0023 | −0.0025 | −0.0027 |
| 640 nm | 0.0881 | 0.0823 | 0.0868 | 0.0903 | 0.0848 | 0.0894 | −0.0022 | −0.0025 | −0.0026 |
| 650 nm | 0.0917 | 0.0856 | 0.0902 | 0.0941 | 0.0883 | 0.0929 | −0.0024 | −0.0027 | −0.0027 |
| 660 nm | 0.0984 | 0.0917 | 0.0964 | 0.1009 | 0.0946 | 0.0994 | −0.0025 | −0.0029 | −0.0030 |
| 670 nm | 0.0973 | 0.0907 | 0.0954 | 0.0999 | 0.0936 | 0.0983 | −0.0026 | −0.0029 | −0.0029 |
| 680 nm | 0.0962 | 0.0897 | 0.0943 | 0.0988 | 0.0925 | 0.0972 | −0.0026 | −0.0028 | −0.0029 |
| 690 nm | 0.0892 | 0.0834 | 0.0877 | 0.0915 | 0.0860 | 0.0903 | −0.0023 | −0.0026 | −0.0026 |
| 700 nm | 0.0821 | 0.0770 | 0.0810 | 0.0842 | 0.0794 | 0.0833 | −0.0021 | −0.0024 | −0.0023 |

(Case II; Case Where Non Dispersion-processed Coloring Agent is Used)

Figure 5:
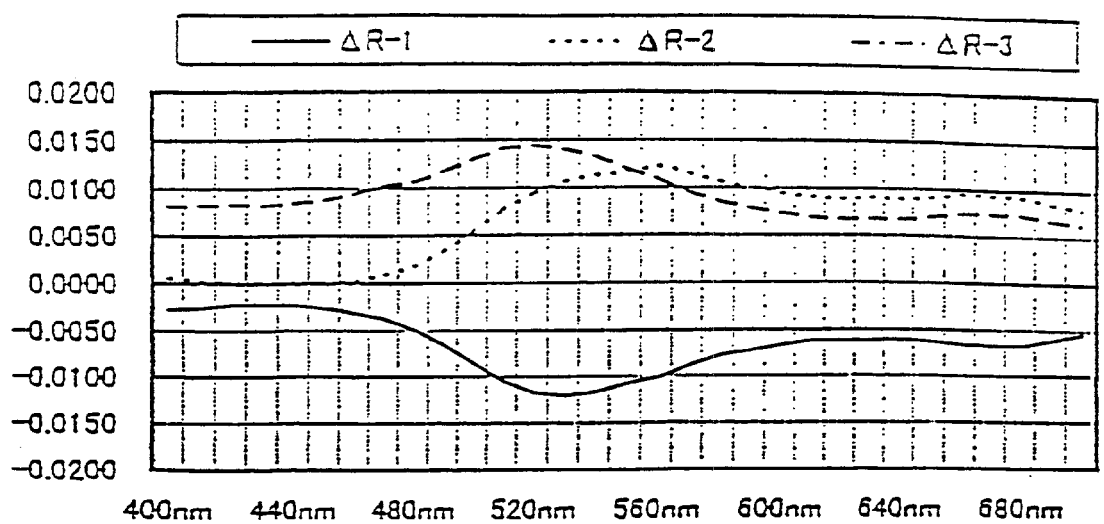
FIG. 5 is a view showing the difference ($\Delta R-n$) curve between actually measured spectral reflectance of other toning sample and simulated spectral reflectance by CCM system.

According to the same manner as that of the above Case I except that a non-dispersion-processed pigment was used in place of a dispersion-processed DA type coloring agent for PVC, samples were obtained and spectral reflectances were obtained similarly. The content is the content used in Table 1 multiplied by a pigment rate of DA color. In addition, database for CCM simulation is database for DA color divided by a pigment rate for each color. The differences ΔR-n between actually measured reflectance RST-n and CCM simulated reflectance RPR-n for a toning sample for the formulation is shown in Table 3. In addition, the difference curves of spectral reflectance regarding to ΔR-n in Table 3 is shown in FIG. 5, and the difference curves of spectral reflectance regarding to (ΔR2-ΔR1) and (ΔR3-ΔR1) are shown in FIG. 5. FIG. 5 is to be compared with FIG. 3, and FIG. 6 to be compared with FIG. 4.

TABLE 3

| | RST-1 | RST-2 | RST-3 | RPR-1 | RPR-2 | RPR-3 | ΔR-1 | ΔR-2 | ΔR-3 |
|---|---|---|---|---|---|---|---|---|---|
| 400 nm | 0.1355 | 0.1308 | 0.1338 | 0.1383 | 0.1302 | 0.1257 | −0.0028 | 0.0006 | 0.0081 |
| 410 nm | 0.1337 | 0.1285 | 0.1315 | 0.1363 | 0.1282 | 0.1233 | −0.0026 | 0.0003 | 0.0082 |
| 420 nm | 0.1319 | 0.1262 | 0.1292 | 0.1342 | 0.1262 | 0.1209 | −0.0023 | 0.0000 | 0.0083 |
| 430 nm | 0.1319 | 0.1260 | 0.1290 | 0.1342 | 0.1261 | 0.1208 | −0.0023 | −0.0001 | 0.0082 |
| 440 nm | 0.1361 | 0.1298 | 0.1330 | 0.1385 | 0.1299 | 0.1245 | −0.0024 | −0.0001 | 0.0085 |
| 450 nm | 0.1419 | 0.1356 | 0.1389 | 0.1446 | 0.1357 | 0.1301 | −0.0027 | −0.0001 | 0.0088 |
| 460 nm | 0.1536 | 0.1472 | 0.1508 | 0.1568 | 0.1469 | 0.1413 | −0.0032 | 0.0003 | 0.0095 |
| 470 nm | 0.1680 | 0.1618 | 0.1658 | 0.1718 | 0.1609 | 0.1554 | −0.0038 | 0.0009 | 0.0104 |
| 480 nm | 0.1856 | 0.1799 | 0.1842 | 0.1905 | 0.1781 | 0.1735 | −0.0049 | 0.0018 | 0.0107 |
| 490 nm | 0.2053 | 0.2004 | 0.2053 | 0.2119 | 0.1971 | 0.1934 | −0.0066 | 0.0033 | 0.0119 |
| 500 nm | 0.2258 | 0.2224 | 0.2279 | 0.2344 | 0.2170 | 0.2148 | −0.0086 | 0.0054 | 0.0131 |
| 510 nm | 0.2393 | 0.2380 | 0.2441 | 0.2498 | 0.2303 | 0.2299 | −0.0105 | 0.0077 | 0.0142 |
| 520 nm | 0.2392 | 0.2403 | 0.2466 | 0.2509 | 0.2308 | 0.2322 | −0.0117 | 0.0095 | 0.0144 |
| 530 nm | 0.2278 | 0.2316 | 0.2376 | 0.2398 | 0.2209 | 0.2236 | −0.0120 | 0.0107 | 0.0140 |
| 540 nm | 0.2084 | 0.2147 | 0.2203 | 0.2200 | 0.2033 | 0.2070 | −0.0116 | 0.0114 | 0.0133 |
| 550 nm | 0.1828 | 0.1914 | 0.1963 | 0.1935 | 0.1797 | 0.1843 | −0.0107 | 0.0117 | 0.0120 |
| 560 nm | 0.1521 | 0.1630 | 0.1672 | 0.1622 | 0.1507 | 0.1562 | −0.0101 | 0.0123 | 0.0110 |
| 570 nm | 0.1262 | 0.1375 | 0.1411 | 0.1350 | 0.1259 | 0.1315 | −0.0088 | 0.0116 | 0.0096 |
| 580 nm | 0.1090 | 0.1199 | 0.1231 | 0.1167 | 0.1092 | 0.1145 | −0.0077 | 0.0107 | 0.0086 |
| 590 nm | 0.0993 | 0.1098 | 0.1127 | 0.1065 | 0.0997 | 0.1048 | −0.0072 | 0.0101 | 0.0079 |
| 600 nm | 0.0899 | 0.1000 | 0.1027 | 0.0965 | 0.0905 | 0.0954 | −0.0066 | 0.0095 | 0.0073 |
| 610 nm | 0.0849 | 0.0946 | 0.0971 | 0.0911 | 0.0855 | 0.0902 | −0.0062 | 0.0091 | 0.0069 |
| 620 nm | 0.0847 | 0.0943 | 0.0967 | 0.0909 | 0.0854 | 0.0900 | −0.0062 | 0.0089 | 0.0067 |
| 630 nm | 0.0837 | 0.0932 | 0.0956 | 0.0898 | 0.0842 | 0.0889 | −0.0061 | 0.0090 | 0.0067 |
| 640 nm | 0.0843 | 0.0937 | 0.0961 | 0.0903 | 0.0848 | 0.0894 | −0.0060 | 0.0089 | 0.0067 |
| 650 nm | 0.0878 | 0.0974 | 0.0999 | 0.0941 | 0.0883 | 0.0929 | −0.0063 | 0.0091 | 0.0070 |
| 660 nm | 0.0943 | 0.1041 | 0.1068 | 0.1009 | 0.0946 | 0.0994 | −0.0066 | 0.0095 | 0.0074 |
| 670 nm | 0.0932 | 0.1030 | 0.1057 | 0.0999 | 0.0936 | 0.0983 | −0.0067 | 0.0094 | 0.0074 |
| 680 nm | 0.0921 | 0.1018 | 0.1045 | 0.0988 | 0.0925 | 0.0972 | −0.0067 | 0.0093 | 0.0073 |

TABLE 3-continued

|  | RST-1 | RST-2 | RST-3 | RPR-1 | RPR-2 | RPR-3 | ΔR-1 | ΔR-2 | ΔR-3 |
|---|---|---|---|---|---|---|---|---|---|
| 690 nm | 0.0855 | 0.0946 | 0.0971 | 0.0915 | 0.0860 | 0.0903 | −0.0060 | 0.0086 | 0.0068 |
| 700 nm | 0.0788 | 0.0874 | 0.0897 | 0.0842 | 0.0794 | 0.0833 | −0.0054 | 0.0080 | 0.0064 |

Figure 6:
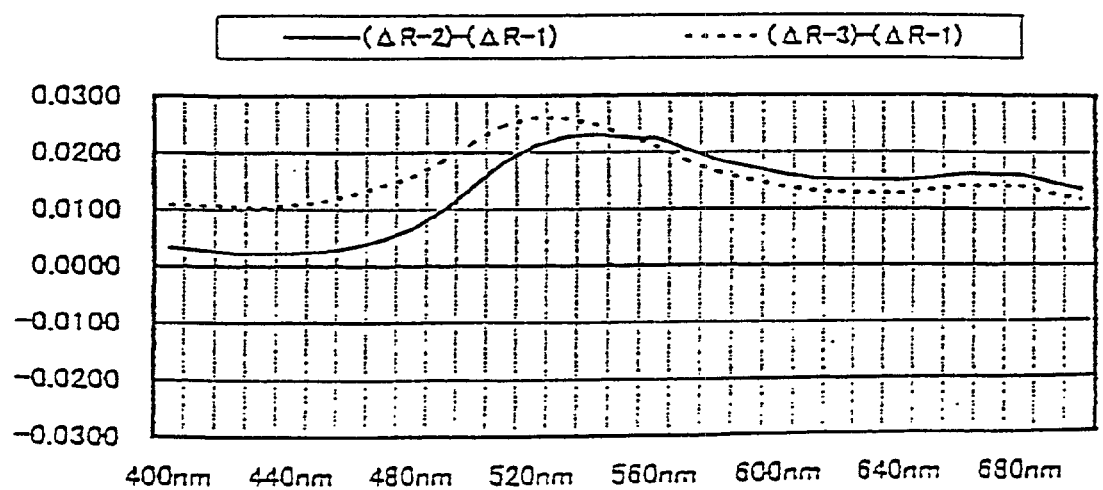
FIG. 6 is a view showing the difference curve for the difference between actually measured spectral reflectance of other toning sample and simulated spectral reflectance by CCM system.

When FIG. 3 and FIG. 5 are compared, a coincidental degree between curves shown in FIG. 3 is apparently better than that shown in FIG. 5. When FIG. 4 and FIG. 6 are compared, similarly, a magnitude of the difference shown in FIG. 6 is apparently greater than that shown in FIG. 4. This shows that the developing reproducibility is worse due to the use of non-dispersion-processed coloring agent in FIG. 5 and FIG. 6. That is, the deterioration of the reproducibility caused by unsuitable coloring agent in the coloring process is recognized.

(Method for Evaluation Based on L*a*b* Color Specification Value and Its Difference)

L*a*b* color specification value and its difference calculated from actually measured reflectance RST−n and simulated reflectance RPR−n in Table 2 are shown in Table 4. In addition, L*a*b* color specification value and its difference calculated from actually measured reflectance RST−n and simulated reflectance RPR−n in Table 3 are shown in Table 5. A method for measuring a color specification value was according to JIS Z 8722 'Method of color measurement. L*a*b* values are in D65 illuminant and 10 degree visual field.

TABLE 6

|  | ① ΔR$_1$ | ② ΔR$_2$ | ③ ΔR$_3$ | Difference ②−① | Difference ③−① |
|---|---|---|---|---|---|
| ΔL* | −0.48 | −0.58 | −0.53 | −0.10 | −0.05 |
| Δa* | 0.24 | 0.25 | 0.21 | 0.01 | −0.03 |
| Δb* | −0.45 | −0.44 | −0.57 | 0.01 | −0.12 |
| Color difference |  |  |  | 0.10 | 0.13 |

TABLE 7

|  | ① ΔR$_1$ | ② ΔR$_2$ | ③ ΔR$_3$ | Difference ②−① | Difference ③−① |
|---|---|---|---|---|---|
| ΔL* | −1.12 | 1.20 | 1.37 | 2.32 | 2.49 |
| Δa* | 0.26 | 0.37 | −0.18 | 0.11 | −0.44 |
| Δb* | −1.15 | 1.91 | 0.12 | 3.06 | 1.27 |
| Color difference |  |  |  | 3.84 | 2.83 |

TABLE 4

|  | RST-1 | RST-2 | RST-3 | RPR-1 | RPR-2 | RPR-3 |  | ΔR$_1$ | ΔR$_2$ | ΔR$_3$ |
|---|---|---|---|---|---|---|---|---|---|---|
| L* | 48.01 | 46.33 | 46.75 | 48.49 | 46.91 | 47.28 | ΔL* | −0.48 | −0.58 | −0.53 |
| a* | −24.62 | −23.50 | −23.19 | −24.86 | −23.75 | −23.40 | Δa* | 0.24 | 0.25 | 0.21 |
| b* | 3.06 | 2.67 | 4.42 | 3.51 | 3.11 | 4.99 | Δb* | −0.45 | −0.44 | −0.57 |

TABLE 5

|  | RST-1 | RST-2 | RST-3 | RPR-1 | RPR-2 | RPR-3 |  | ΔR$_1$ | ΔR$_2$ | ΔR$_3$ |
|---|---|---|---|---|---|---|---|---|---|---|
| L* | 47.37 | 48.11 | 48.65 | 48.49 | 46.91 | 47.28 | ΔL* | −1.12 | −1.20 | 1.37 |
| a* | −24.60 | −23.38 | −23.58 | −24.86 | −23.75 | −23.40 | Δa* | 0.26 | 0.37 | −0.18 |
| b* | 2.36 | 5.02 | 5.11 | 3.51 | 3.11 | 4.99 | Δb* | −1.15 | 1.91 | 0.12 |

When ΔR1, ΔR2 and ΔR3 in Table 4 and Table 5 are compared, it can be seen that values are generally greater in Table 5. This shows that the developing reproducibility is worse due to the use of a non-dispersion-processed pigment. That is, the deterioration of the reproducibility caused by unsuitable coloring agent in a coloring process is recognized.

(Method for Evaluation Based on Difference of Difference of L*a*b*)

The difference between ΔR1, ΔR2 and ΔR3 in Table 4 using ΔR1 as a standard and the color difference calculated from the difference are shown in Table 6. The difference between ΔR1, ΔR2 and ΔR3 in Table 5 using ΔR1 as a standard and the color difference calculated from the difference are shown in Table 7.

When color difference in Table 6 and Table 7 are compared, it can be seen that color difference in Table 7 is greater. This shows that the developing reproducibility is worse due to the use of a non-dispersion-processed pigment. That is, the deterioration of the reproducibility caused by unsuitable coloring agent in the coloring process is recognized.

(Method for Evaluation Based on Statistical Treatment Results of Difference of L*a*b* Color Specification Value)

The difference of L*a*b* color specification value calculated from actually measured reflectance RST−n and simulated reflectance RPR−n is statistically treated, it is easier to determine comprehensively. Standard deviation is suitable in the case where data are large such as correction toning of lot product in production section. In addition, when data are small in such case as new color toning, (maximum-minimum) and an average are suitable. Herein, an example using (maximum-minimum) and an average is shown as an example of new color toning in Table 8 and 9. Table 8 and Table 9 show (maximum-minimum) of ΔR–n in Table 4 and Table 5 and difference between ΔR–ns and its average, respectively, and show color difference calculated from those values.

TABLE 8

|  | ① ΔR$_1$ | ② ΔR$_2$ | ③ ΔR$_3$ | Maximum-minimum |
|---|---|---|---|---|
| ΔL* | −0.48 | −0.58 | −0.53 | 0.10 |
| Δa* | 0.24 | 0.25 | 0.21 | 0.04 |
| Δb* | −0.45 | −0.44 | −0.57 | 0.13 |
| Color difference |  |  |  | 0.17 |

|  | ④ difference ① − ② | ⑤ difference ② − ③ | ⑥ difference ③ − ① | Average of ④, ⑤ and ⑥ |
|---|---|---|---|---|
| ΔL* | 0.10 | 0.05 | 0.05 | 0.07 |
| Δa* | 0.01 | 0.04 | 0.03 | 0.03 |
| Δb* | 0.01 | 0.13 | 0.12 | 0.09 |
| 色差 | 0.10 | 0.14 | 0.13 | 0.11 |

TABLE 9

|  | ① ΔR$_1$ | ② ΔR$_2$ | ③ ΔR$_3$ | Maximum-minimum |
|---|---|---|---|---|
| ΔL* | −1.12 | 1.20 | 1.37 | 2.49 |
| Δa* | 0.26 | 0.37 | −0.18 | 0.55 |
| Δb* | −1.15 | 1.91 | 0.12 | 3.06 |
| Color difference |  |  |  | 3.98 |

|  | ④ difference ① − ② | ⑤ difference ② − ③ | ⑥ difference ③ − ① | Average of ④, ⑤ and ⑥ |
|---|---|---|---|---|
| ΔL* | 2.32 | 0.17 | 2.49 | 1.66 |
| Δa* | 0.11 | 0.55 | 0.44 | 0.37 |
| Δb* | 3.06 | 1.79 | 1.27 | 2.04 |
| 色差 | 3.84 | 1.88 | 2.83 | 2.66 |

The color differences in Table 8 and Table 9 are the reproducibility in the case of comprehensive determination. The color difference in Table 9 where a non-dispersion-processed pigment is used is remarkably greater than that in Table 8 where a dispersion-processed coloring agent is used. That is, the deterioration of the reproducibility caused by unsuitable coloring agent in a coloring process is recognized.

(CCM Screen Display)

Figure 7:
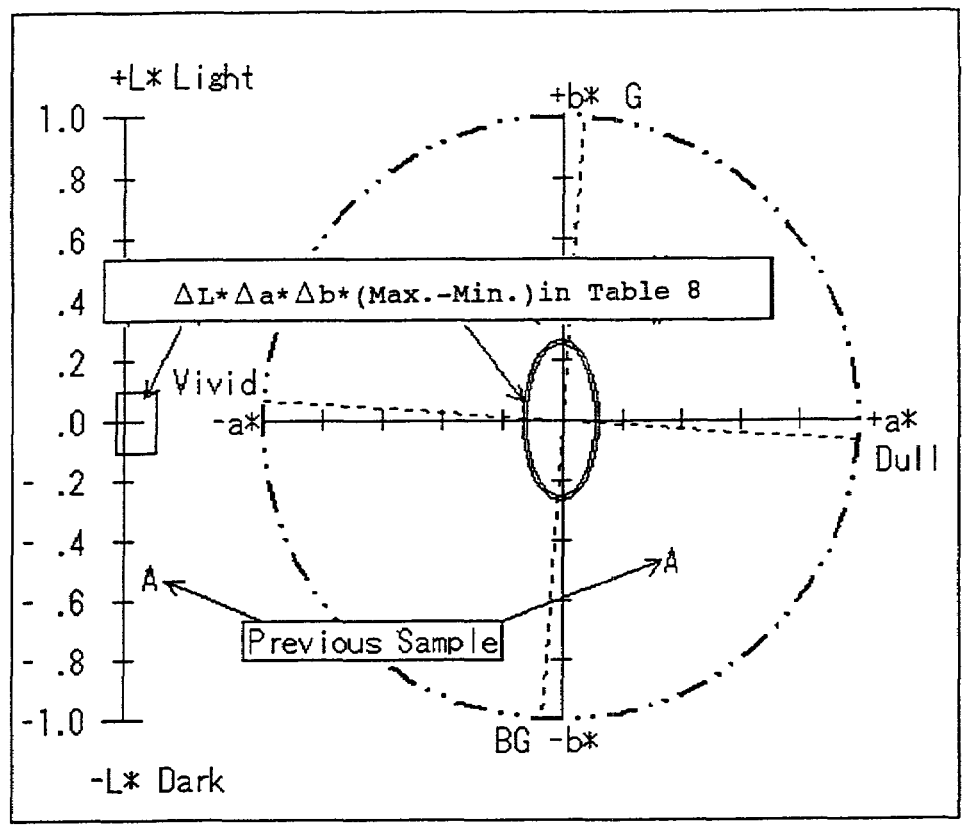
FIG. 7 is a view showing one example of a computer screen displaying the reproducibility.

A method for evaluating the reproducibility of a toning sample was incorporated in a CCM software, and the reproducibility was displayed on a computer screen of a CCM system. One example of a computer screen display is shown is in Table 7 and Table 8. L*a*b* color displaying value indicates a color space (steric image) and, in FIG. 7 and FIG. 8, the color is displayed by both of an ordinate axis (Light-Dark axis) showing L* (lightness) and a circular graph showing a*b*. In addition, a midpoint of a circular graph shows chromaticity (a*, b*) of the target color and is situated at the corresponding location in a color space. Therefore, a midpoint of an a*b* orthogonal axis of a color space is on an extended line in a dull direction of (vivd-dull) axis showing chroma, and a hue axis, here G(Green)-BG (BLueGreen) axis, is orthogonal with (vivd-dull) axis. In FIG. 7, a square part on an ordinate axis shows (maximum-minimum) of ΔL* (lightness) in Table 8, that is, the reproducibility, and elliptical double lines show (maximum-minimum) of Δa* and Δb* in Table 8, that is, the reproducibility. In addition, A point shows the relationship between actually measured position of the last time product (immediate prior product) and that of the target color in a toning sample producing process.

From FIG. 7, it is determined that since the last time product is outside a range of the reproducibility, there is still room for correction and toning should be continued.

Figure 8:
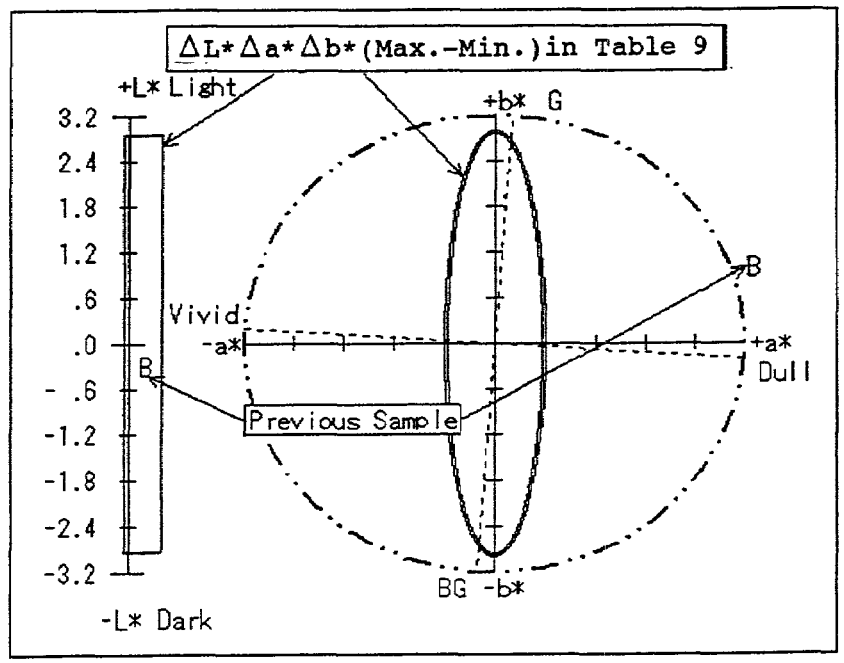
FIG. 8 is a view showing another example of a computer screen displaying the reproducibility.

In addition, in FIG. 8, a square part of an ordinate shows (maximum-minimum) of ΔL* (lightness) in Table 9, that is, the reproducibility, and elliptical double lines show (maximum-minimum) of Δa* and Δb* in Table 9, that is, the reproducibility. In addition, B point shows color difference between the last time product (immediate prior product) and the target color in a toning sample producing process.

From FIG. 8, it is determined that since the last time product is inside a range of the reproducibility of ΔL* indicating Light-Dark, it is impossible to further correct and toning should be stopped.

Example 2

(Case 3: Method for Testing an Abnormal Sample Product in a Toning Process in Reproducibility Evaluation)

A sample group A was produced at the formulating rate (unit is "gram") shown in Table 10 using dispersion-processed DA color having the excellent developing reproducibility, which was used in the aforementioned Case I. That is, the sample formulation was determined by CCM simulation so that ΔE* is changed by 2 degrees by change of one of three attributes hue (H+), lightness (V+) and chroma (C+) relative to a standard, and an abnormal sample product was produced by adding a heterogeneous coloring agent to a standard product to change ΔE* by around 1 to obtain the abnormal sample formulation b. The sample producing procedure was the same as in Case I.

TABLE 10

|  | A-standard | A-H+ | A-V+ | A-C+ | A-b |
|---|---|---|---|---|---|
| PVC resin compound | 50 | 50 | 50 | 50 | 50 |
| EP-4050 (White) | 0.8485 | 0.8422 | 0.8672 | 0.8379 | 0.8485 |
| P-4710 (Black) (1/10) | 0.0540 | 0.0568 | 0.0471 | 0.0499 | 0.0540 |
| P-4172 (Red) | 0.0257 | 0.0218 | 0.0224 | 0.0289 | 0.0257 |
| P-4420 (Yellow) | 0.0718 | 0.0792 | 0.0633 | 0.0833 | 0.0718 |
| P-4510 (Green) | — | — | — | — | 0.0050 |

Here, it is on the assumption that, in trying to produce a standard, samples H+, V+ and C+, a standard was erroneously produced according to the formulation b. The results of these actually measured reflectance RST–n and simulated reflectance RPR–n, the difference ΔR–n between both reflectances and ΔR–ave except for A-b sample are shown in Table 11 and FIG. 9. In the case of the b sample, A-b sample was used in measurement of actually measured reflectance RST–b, and A–standard formulation was used in simulation of simulated reflectance RPR–b by CCM system. In addition, the color specification value, the difference of color specification value and the color difference calculated from actually measured reflectance RST–n and simulated reflectance RPR–n are shown in Table 12, respectively. In Table 12, L*a*b* values are in D65 illuminant and 10 degree visual field.

TABLE 11

| Wavelength | RST (A-H+) | RPR (A-H+) | RST (A-V+) | RPR (A-V+) | RST (A-C+) | RPR (A-C+) | RST (A-b) | RPR (A-std) | ΔR (A-H+) | ΔR (A-V+) | ΔR (A-C+) | ΔR (A-b) | ΔR-ave |
|---|---|---|---|---|---|---|---|---|---|---|---|---|---|
| 380 nm | 0.0806 | 0.0823 | 0.0869 | 0.0886 | 0.0807 | 0.0816 | 0.0804 | 0.0838 | −0.0017 | −0.0017 | −0.0009 | −0.0034 | −0.0014 |
| 390 nm | 0.1098 | 0.1128 | 0.1218 | 0.1260 | 0.1091 | 0.1121 | 0.1124 | 0.1164 | −0.0030 | −0.0042 | −0.0030 | −0.0040 | −0.0034 |
| 400 nm | 0.1390 | 0.1432 | 0.1566 | 0.1633 | 0.1375 | 0.1425 | 0.1443 | 0.1490 | −0.0042 | −0.0067 | −0.0050 | −0.0047 | −0.0053 |
| 410 nm | 0.1366 | 0.1409 | 0.1542 | 0.1614 | 0.1345 | 0.1398 | 0.1421 | 0.1468 | −0.0043 | −0.0072 | −0.0053 | −0.0047 | −0.0056 |
| 420 nm | 0.1342 | 0.1385 | 0.1518 | 0.1595 | 0.1314 | 0.1370 | 0.1399 | 0.1445 | −0.0043 | −0.0077 | −0.0056 | −0.0046 | −0.0059 |
| 430 nm | 0.1317 | 0.1373 | 0.1489 | 0.1581 | 0.1293 | 0.1356 | 0.1369 | 0.1432 | −0.0056 | −0.0092 | −0.0063 | −0.0063 | −0.0070 |
| 440 nm | 0.1321 | 0.1387 | 0.1495 | 0.1593 | 0.1292 | 0.1369 | 0.1375 | 0.1443 | −0.0066 | −0.0098 | −0.0077 | −0.0068 | −0.0080 |
| 450 nm | 0.1352 | 0.1416 | 0.1520 | 0.1618 | 0.1324 | 0.1396 | 0.1397 | 0.1467 | −0.0064 | −0.0098 | −0.0072 | −0.0070 | −0.0078 |
| 460 nm | 0.1404 | 0.1483 | 0.1569 | 0.1679 | 0.1368 | 0.1459 | 0.1439 | 0.1526 | −0.0079 | −0.0110 | −0.0091 | −0.0087 | −0.0093 |
| 470 nm | 0.1464 | 0.1547 | 0.1626 | 0.1734 | 0.1424 | 0.1516 | 0.1486 | 0.1578 | −0.0083 | −0.0108 | −0.0092 | −0.0092 | −0.0094 |
| 480 nm | 0.1527 | 0.1620 | 0.1686 | 0.1792 | 0.1480 | 0.1579 | 0.1537 | 0.1635 | −0.0093 | −0.0106 | −0.0099 | −0.0098 | −0.0099 |
| 490 nm | 0.1590 | 0.1682 | 0.1739 | 0.1841 | 0.1534 | 0.1632 | 0.1585 | 0.1679 | −0.0092 | −0.0102 | −0.0098 | −0.0094 | −0.0097 |
| 500 nm | 0.1640 | 0.1721 | 0.1776 | 0.1862 | 0.1567 | 0.1657 | 0.1614 | 0.1698 | −0.0081 | −0.0086 | −0.0090 | −0.0084 | −0.0086 |
| 510 nm | 0.1647 | 0.1721 | 0.1770 | 0.1847 | 0.1559 | 0.1642 | 0.1602 | 0.1682 | −0.0074 | −0.0077 | −0.0083 | −0.0080 | −0.0078 |
| 520 nm | 0.1670 | 0.1738 | 0.1791 | 0.1860 | 0.1578 | 0.1656 | 0.1620 | 0.1694 | −0.0068 | −0.0069 | −0.0078 | −0.0074 | −0.0072 |
| 530 nm | 0.1733 | 0.1790 | 0.1859 | 0.1919 | 0.1649 | 0.1716 | 0.1686 | 0.1748 | −0.0057 | −0.0060 | −0.0067 | −0.0062 | −0.0061 |
| 540 nm | 0.1746 | 0.1799 | 0.1877 | 0.1930 | 0.1666 | 0.1728 | 0.1700 | 0.1758 | −0.0053 | −0.0053 | −0.0062 | −0.0058 | −0.0056 |
| 550 nm | 0.1734 | 0.1787 | 0.1860 | 0.1916 | 0.1651 | 0.1715 | 0.1685 | 0.1746 | −0.0053 | −0.0056 | −0.0064 | −0.0061 | −0.0058 |
| 560 nm | 0.1810 | 0.1854 | 0.1951 | 0.1997 | 0.1745 | 0.1800 | 0.1768 | 0.1822 | −0.0044 | −0.0046 | −0.0055 | −0.0054 | −0.0048 |
| 570 nm | 0.2018 | 0.2053 | 0.2202 | 0.2236 | 0.2010 | 0.2056 | 0.2003 | 0.2049 | −0.0035 | −0.0034 | −0.0046 | −0.0046 | −0.0038 |
| 580 nm | 0.2220 | 0.2243 | 0.2453 | 0.2478 | 0.2290 | 0.2323 | 0.2234 | 0.2277 | −0.0023 | −0.0025 | −0.0033 | −0.0043 | −0.0027 |
| 590 nm | 0.2312 | 0.2339 | 0.2576 | 0.2605 | 0.2435 | 0.2470 | 0.2333 | 0.2397 | −0.0027 | −0.0029 | −0.0035 | −0.0064 | −0.0030 |
| 600 nm | 0.2357 | 0.2363 | 0.2633 | 0.2644 | 0.2504 | 0.2517 | 0.2365 | 0.2433 | −0.0006 | −0.0011 | −0.0013 | −0.0068 | −0.0010 |
| 610 nm | 0.2368 | 0.2370 | 0.2648 | 0.2656 | 0.2521 | 0.2532 | 0.2357 | 0.2444 | −0.0002 | −0.0008 | −0.0011 | −0.0087 | −0.0007 |
| 620 nm | 0.2363 | 0.2371 | 0.2644 | 0.2657 | 0.2524 | 0.2536 | 0.2345 | 0.2445 | −0.0008 | −0.0013 | −0.0012 | −0.0100 | −0.0011 |
| 630 nm | 0.2354 | 0.2361 | 0.2633 | 0.2648 | 0.2514 | 0.2526 | 0.2329 | 0.2436 | −0.0007 | −0.0015 | −0.0012 | −0.0107 | −0.0011 |
| 640 nm | 0.2336 | 0.2350 | 0.2618 | 0.2638 | 0.2497 | 0.2515 | 0.2309 | 0.2425 | −0.0014 | −0.0020 | −0.0018 | −0.0116 | −0.0017 |
| 650 nm | 0.2325 | 0.2331 | 0.2604 | 0.2618 | 0.2484 | 0.2496 | 0.2295 | 0.2406 | −0.0006 | −0.0014 | −0.0012 | −0.0111 | −0.0011 |
| 660 nm | 0.2332 | 0.2325 | 0.2610 | 0.2612 | 0.2490 | 0.2489 | 0.2312 | 0.2400 | 0.0007 | −0.0002 | 0.0001 | −0.0088 | 0.0002 |
| 670 nm | 0.2329 | 0.2314 | 0.2607 | 0.2601 | 0.2486 | 0.2478 | 0.2323 | 0.2390 | 0.0015 | 0.0006 | 0.0008 | −0.0067 | 0.0010 |
| 680 nm | 0.2326 | 0.2303 | 0.2603 | 0.2589 | 0.2482 | 0.2466 | 0.2335 | 0.2379 | 0.0023 | 0.0014 | 0.0016 | −0.0044 | 0.0018 |
| 690 nm | 0.2307 | 0.2289 | 0.2582 | 0.2574 | 0.2462 | 0.2452 | 0.2323 | 0.2365 | 0.0018 | 0.0008 | 0.0010 | −0.0042 | 0.0012 |
| 700 nm | 0.2287 | 0.2275 | 0.2560 | 0.2559 | 0.2441 | 0.2437 | 0.2311 | 0.2350 | 0.0012 | 0.0001 | 0.0004 | −0.0039 | 0.0006 |

TABLE 12

| | | D65/10° | | | | | | | | | |
|---|---|---|---|---|---|---|---|---|---|---|---|
| No. | Sample Name | L* | a* | b* | ΔL* | Δa* | Δb* | ΔE* | Δ(ΔL*) | Δ(Δa*) | Δ(Δ)b* | Δ(ΔE*) |
| 1 | RST(A-ave) | 51.31 | 7.19 | 11.24 | −0.58 | 0.74 | 0.96 | 1.34 | −0.58 | 0.74 | 0.96 | 1.34 |
| 2 | RPR(A-ave+) | 51.89 | 6.45 | 10.28 | | | | | | | | |
| 1 | RST(A-H+) | 50.67 | 5.71 | 11.16 | −0.54 | 0.79 | 0.77 | 1.23 | −0.54 | 0.79 | 0.77 | 1.23 |
| 2 | RPR(A-H+) | 51.21 | 4.92 | 10.39 | | | | | | | | |
| 3 | RST(A-V+) | 52.69 | 7.21 | 10.68 | −0.56 | 0.58 | 1.25 | 1.49 | −0.56 | 0.58 | 1.25 | 1.49 |
| 4 | RPR(A-V+) | 53.25 | 6.63 | 9.43 | | | | | | | | |
| 5 | RST(A-C+) | 50.58 | 8.66 | 11.87 | −0.64 | 0.86 | 0.85 | 1.37 | −0.64 | 0.86 | 0.85 | 1.37 |
| 6 | RPR(A-C+) | 51.22 | 7.80 | 11.02 | | | | | | | | |
| 7 | RST(A-b) | 50.42 | 6.67 | 9.83 | −0.80 | 0.04 | 0.42 | 0.90 | −0.80 | 0.04 | 0.42 | 0.90 |
| 8 | RPR(A-std) | 51.22 | 6.63 | 9.41 | | | | | | | | |

Figure 9:
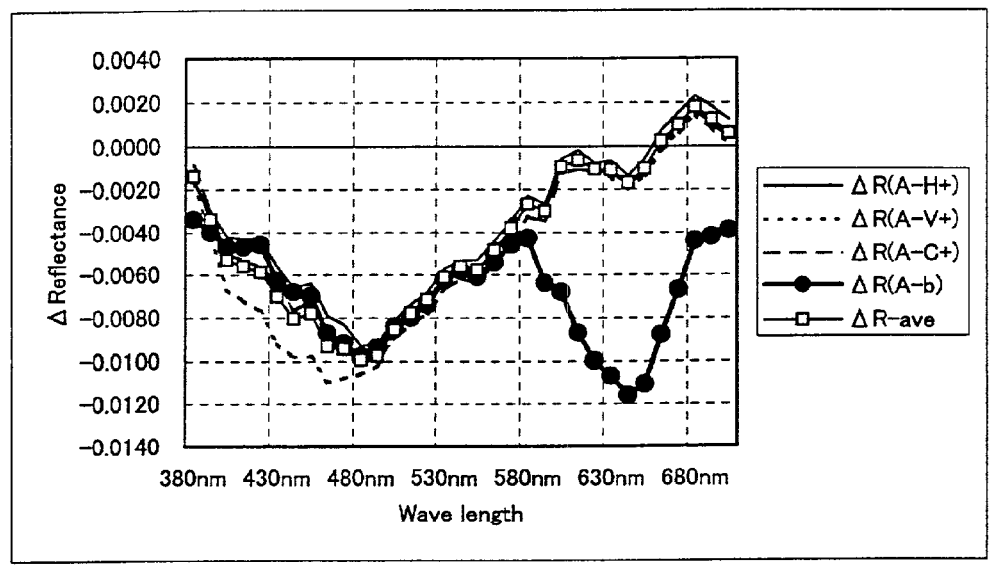
FIG. 9 is a view showing the difference ($\Delta R-n$) curve for samples in Example 2.

As apparent from Table 11, Table 12 and FIG. 9, ΔR(A–b) shows the abnormal value as compared with ΔR(A–H+), ΔR(A–V+) and ΔR(A–C+), and sample b can be extracted as an abnormal product. In Table 12, the designated value "2.0" of ΔE* includes simulation error, resulting in "1.23", "1.49" and "1.37" but they are close and, similarly, the designated value "1.0" of ΔE* resulted in "0.9". Then, provisional true RST'–b was obtained, and ΔR'–b and ΔR"–b were calculated. The results are shown in Table 13 and FIG. 10. In addition, in order to obtain the relationship between ΔR–actual sample, the standard formulation was produced according to the correct method, and its actually measured reflectance RST–standard was measured. The results are shown in Table 13 and FIG. 10, together with actually measured RST–b. The relationship between ΔR–actual sample refers to the difference between RST–standard and actually measured RST–b.

TABLE 13

| Wavelength | RST'-b | RST-b | ΔR'-b | ΔR"-b | RST-std | ΔR-|actual| | ΔR-b |
|---|---|---|---|---|---|---|---|
| 380 nm | 0.0824 | 0.0804 | 0.0020 | 0.0020 | 0.0807 | 0.0003 | −0.0034 |
| 390 nm | 0.1130 | 0.1124 | 0.0006 | 0.0006 | 0.1129 | 0.0005 | −0.0040 |
| 400 nm | 0.1437 | 0.1443 | −0.0006 | −0.0006 | 0.1451 | 0.0008 | −0.0047 |

TABLE 13-continued

| Wavelength | RST'-b | RST-b | ΔR'-b | ΔR"-b | RST-std | ΔR-|actual| | ΔR-b |
|---|---|---|---|---|---|---|---|
| 410 nm | 0.1412 | 0.1421 | −0.0009 | −0.0009 | 0.1428 | 0.0007 | −0.0047 |
| 420 nm | 0.1386 | 0.1399 | −0.0013 | −0.0013 | 0.1404 | 0.0005 | −0.0046 |
| 430 nm | 0.1362 | 0.1369 | −0.0007 | −0.0007 | 0.1373 | 0.0004 | −0.0063 |
| 440 nm | 0.1363 | 0.1375 | −0.0012 | −0.0012 | 0.1378 | 0.0003 | −0.0068 |
| 450 nm | 0.1389 | 0.1397 | −0.0008 | −0.0008 | 0.1400 | 0.0003 | −0.0070 |
| 460 nm | 0.1433 | 0.1439 | −0.0006 | −0.0006 | 0.1441 | 0.0002 | −0.0087 |
| 470 nm | 0.1484 | 0.1486 | −0.0002 | −0.0002 | 0.1487 | 0.0001 | −0.0092 |
| 480 nm | 0.1536 | 0.1537 | −0.0001 | −0.0001 | 0.1538 | 0.0001 | −0.0098 |
| 490 nm | 0.1582 | 0.1585 | −0.0003 | −0.0003 | 0.1585 | 0.0000 | −0.0094 |
| 500 nm | 0.1612 | 0.1614 | −0.0002 | −0.0002 | 0.1614 | 0.0000 | −0.0084 |
| 510 nm | 0.1604 | 0.1602 | 0.0002 | 0.0002 | 0.1603 | 0.0001 | −0.0080 |
| 520 nm | 0.1622 | 0.1620 | 0.0002 | 0.0002 | 0.1621 | 0.0001 | −0.0074 |
| 530 nm | 0.1687 | 0.1686 | 0.0001 | 0.0001 | 0.1687 | 0.0001 | −0.0062 |
| 540 nm | 0.1702 | 0.1700 | 0.0002 | 0.0002 | 0.1702 | 0.0002 | −0.0058 |
| 550 nm | 0.1688 | 0.1685 | 0.0003 | 0.0003 | 0.1689 | 0.0004 | −0.0061 |
| 560 nm | 0.1774 | 0.1768 | 0.0006 | 0.0006 | 0.1774 | 0.0006 | −0.0054 |
| 570 nm | 0.2011 | 0.2003 | 0.0008 | 0.0008 | 0.2014 | 0.0011 | −0.0046 |
| 580 nm | 0.2250 | 0.2234 | 0.0016 | 0.0016 | 0.2256 | 0.0022 | −0.0043 |
| 590 nm | 0.2367 | 0.2333 | 0.0034 | 0.0034 | 0.2373 | 0.0040 | −0.0064 |
| 600 nm | 0.2423 | 0.2365 | 0.0058 | 0.0058 | 0.2430 | 0.0065 | −0.0068 |
| 610 nm | 0.2437 | 0.2357 | 0.0080 | 0.0080 | 0.2443 | 0.0086 | −0.0087 |
| 620 nm | 0.2434 | 0.2345 | 0.0089 | 0.0089 | 0.2441 | 0.0096 | −0.0100 |
| 630 nm | 0.2425 | 0.2329 | 0.0096 | 0.0096 | 0.2430 | 0.0101 | −0.0107 |
| 640 nm | 0.2408 | 0.2309 | 0.0099 | 0.0099 | 0.2414 | 0.0105 | −0.0116 |
| 650 nm | 0.2395 | 0.2295 | 0.0100 | 0.0100 | 0.2400 | 0.0105 | −0.0111 |
| 660 nm | 0.2402 | 0.2312 | 0.0090 | 0.0090 | 0.2408 | 0.0096 | −0.0088 |
| 670 nm | 0.2400 | 0.2323 | 0.0077 | 0.0077 | 0.2405 | 0.0082 | −0.0067 |
| 680 nm | 0.2397 | 0.2335 | 0.0062 | 0.0062 | 0.2402 | 0.0067 | −0.0044 |
| 690 nm | 0.2377 | 0.2323 | 0.0054 | 0.0054 | 0.2383 | 0.0060 | −0.0042 |
| 700 nm | 0.2356 | 0.2311 | 0.0045 | 0.0045 | 0.2363 | 0.0052 | −0.0039 |

Figure 10:
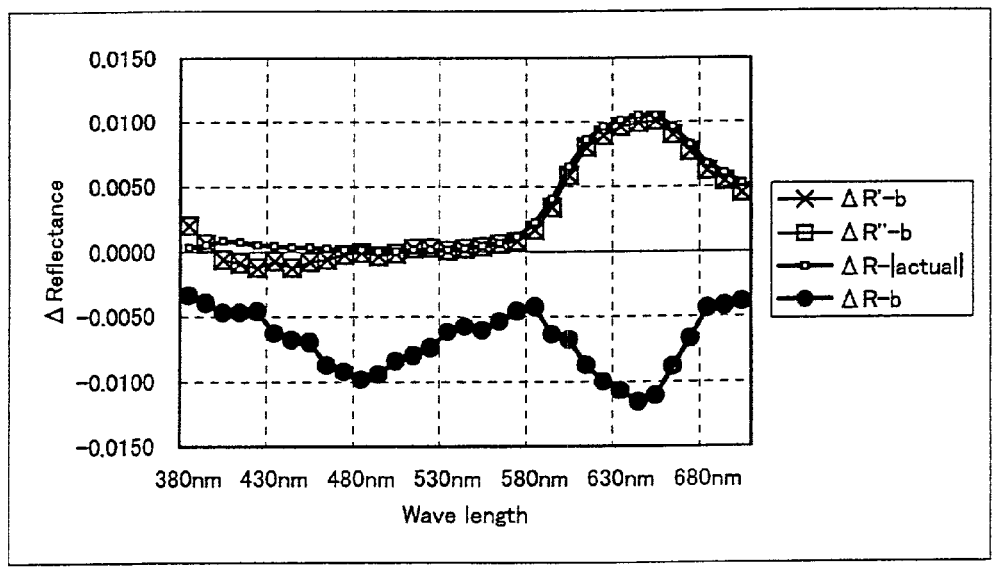
FIG. 10 is a view showing the relationship between $\Delta R'-b$, $\Delta R''-b$, $\Delta R-b$ and $\Delta R-actual$.

As apparent from Table 13 and FIG. 10, ΔR'−b and ΔR"−b obtained by calculation are extremely coincident with the ΔR−actual, and it was confirmed that the use of ΔR'−b and ΔR"−b as a simulated value is effective. The previous method when CCM is applied to evaluation of the reproducibility of the known formulation sample compared actually measured reflectance RST of the sample and simulated reflectance RPR calculated from the known formulation for the sample and determined abnormal when its difference ΔR is too great. That is, since the previous method was an evaluation method in which evaluation was performed on individual samples, when a reproductive error was small, it was negligible as compared with simulation error and, thus, abnormality could not be detected. However, according to the present method, evaluation is performed between respective samples and, thus, an abnormal sample in the case of small error can be also detected. That is, it can be seen that ΔR−b obtained by the previous method (ΔR(A−b) in the figure) is remarkably remote from the actually measured ΔR−actual.

Then, in order to presume from which coloring agent the error factor of an abnormal product b is derived, the reflectance of a target was set to be (RST−b−ΔR−ave), CCM database with 20 kinds of coloring agent registered therein was used, those having the high coincidental rate of spectral reflectance with that of a target sample was selected, RPR−m thereof was simulated, and the difference ΔR'−m to RPR−b calculated from the regular formulation, more particularly, ΔR'−1, ΔR'−2, ΔR'−3, ΔR'−4, ΔR'−5 were obtained. The results thereof and the difference between ΔR'−m and ΔR'−b are shown in Table 14 and FIG. 11. Here, m indicates the number of the selected formulation.

| Wavelength | Δ R'-1 | Δ R'-2 | Δ R'-3 | Δ R'-4 | Δ R'-5 | (Δ R'-1)-(Δ R'-b) | (Δ R'-2)-(Δ R'-b) | (Δ R'-3)-(Δ R'-b) | (Δ R'-4)-(Δ R'-b) | (Δ R'-5)-(Δ R'-b) |
|---|---|---|---|---|---|---|---|---|---|---|
| 380 nm | −0.0001 | −0.0001 | −0.0004 | −0.0004 | 0.0004 | −0.0021 | −0.0021 | −0.0024 | −0.0024 | −0.0016 |
| 390 nm | −0.0002 | −0.0001 | −0.0010 | −0.0005 | 0.0001 | −0.0008 | −0.0007 | −0.0016 | −0.0011 | −0.0005 |
| 400 nm | −0.0003 | −0.0001 | −0.0015 | −0.0006 | −0.0002 | 0.0003 | 0.0005 | −0.0009 | 0.0000 | 0.0004 |
| 410 nm | −0.0005 | −0.0004 | −0.0008 | −0.0009 | −0.0009 | 0.0004 | 0.0005 | 0.0001 | 0.0000 | 0.0000 |
| 420 nm | −0.0007 | −0.0007 | −0.0002 | −0.0013 | −0.0016 | 0.0006 | 0.0006 | 0.0011 | 0.0000 | −0.0003 |
| 430 nm | −0.0007 | −0.0008 | 0.0000 | −0.0013 | −0.0016 | 0.0000 | −0.0001 | 0.0007 | −0.0006 | −0.0009 |
| 440 nm | −0.0008 | −0.0009 | −0.0003 | −0.0013 | −0.0014 | 0.0004 | 0.0003 | 0.0009 | −0.0001 | −0.0002 |
| 450 nm | −0.0008 | −0.0009 | −0.0005 | −0.0012 | −0.0011 | 0.0000 | −0.0001 | 0.0003 | −0.0004 | −0.0003 |
| 460 nm | −0.0008 | −0.0009 | −0.0009 | −0.0007 | −0.0005 | −0.0002 | −0.0003 | −0.0003 | −0.0001 | 0.0001 |
| 470 nm | −0.0007 | −0.0007 | −0.0013 | −0.0001 | 0.0001 | −0.0005 | −0.0005 | −0.0011 | 0.0001 | 0.0003 |
| 480 nm | −0.0005 | −0.0004 | −0.0015 | 0.0005 | 0.0005 | −0.0004 | −0.0003 | −0.0014 | 0.0006 | 0.0006 |
| 490 nm | −0.0003 | 0.0001 | −0.0016 | 0.0012 | 0.0009 | 0.0000 | 0.0004 | −0.0013 | 0.0015 | 0.0012 |
| 500 nm | −0.0001 | 0.0007 | −0.0011 | 0.0012 | 0.0008 | 0.0001 | 0.0009 | −0.0009 | 0.0014 | 0.0010 |
| 510 nm | 0.0002 | 0.0002 | 0.0001 | 0.0000 | 0.0001 | 0.0000 | 0.0000 | −0.0001 | −0.0002 | −0.0001 |
| 520 nm | 0.0003 | −0.0003 | 0.0003 | 0.0000 | 0.0003 | 0.0001 | −0.0005 | 0.0001 | −0.0002 | 0.0001 |
| 530 nm | 0.0003 | 0.0008 | −0.0006 | 0.0011 | 0.0014 | 0.0002 | 0.0007 | −0.0007 | 0.0010 | 0.0013 |
| 540 nm | 0.0004 | 0.0020 | −0.0001 | 0.0010 | 0.0011 | 0.0002 | 0.0018 | −0.0003 | 0.0008 | 0.0009 |

-continued

| Wavelength | Δ R'-1 | Δ R'-2 | Δ R'-3 | Δ R'-4 | Δ R'-5 | (Δ R'-1)-(Δ R'-b) | (Δ R'-2)-(Δ R'-b) | (Δ R'-3)-(Δ R'-b) | (Δ R'-4)-(Δ R'-b) | (Δ R'-5)-(Δ R'-b) |
|---|---|---|---|---|---|---|---|---|---|---|
| 550 nm | 0.0005 | 0.0003 | 0.0017 | −0.0009 | −0.0011 | 0.0002 | 0.0000 | 0.0014 | −0.0012 | −0.0014 |
| 560 nm | 0.0006 | −0.0013 | 0.0025 | −0.0021 | −0.0025 | 0.0000 | −0.0019 | 0.0019 | −0.0027 | −0.0031 |
| 570 nm | 0.0009 | −0.0016 | 0.0013 | −0.0004 | −0.0004 | 0.0001 | −0.0024 | 0.0005 | −0.0012 | −0.0012 |
| 580 nm | 0.0016 | 0.0021 | 0.0005 | 0.0034 | 0.0035 | 0.0000 | 0.0005 | −0.0011 | 0.0018 | 0.0019 |
| 590 nm | 0.0032 | 0.0057 | 0.0018 | 0.0061 | 0.0063 | −0.0002 | 0.0023 | −0.0016 | 0.0027 | 0.0029 |
| 600 nm | 0.0058 | 0.0075 | 0.0060 | 0.0075 | 0.0076 | 0.0000 | 0.0017 | 0.0002 | 0.0017 | 0.0018 |
| 610 nm | 0.0080 | 0.0082 | 0.0096 | 0.0079 | 0.0079 | 0.0000 | 0.0002 | 0.0016 | −0.0001 | −0.0001 |
| 620 nm | 0.0091 | 0.0084 | 0.0102 | 0.0081 | 0.0080 | 0.0002 | −0.0005 | 0.0013 | −0.0008 | −0.0009 |
| 630 nm | 0.0097 | 0.0086 | 0.0105 | 0.0082 | 0.0082 | 0.0001 | −0.0010 | 0.0009 | −0.0014 | −0.0014 |
| 640 nm | 0.0101 | 0.0085 | 0.0099 | 0.0082 | 0.0081 | 0.0002 | −0.0014 | 0.0000 | −0.0017 | −0.0018 |
| 650 nm | 0.0101 | 0.0085 | 0.0062 | 0.0081 | 0.0082 | 0.0001 | −0.0015 | −0.0038 | −0.0019 | −0.0018 |
| 660 nm | 0.0091 | 0.0085 | 0.0012 | 0.0081 | 0.0082 | 0.0001 | −0.0005 | −0.0078 | −0.0009 | −0.0008 |
| 670 nm | 0.0076 | 0.0085 | 0.0015 | 0.0081 | 0.0082 | −0.0001 | 0.0008 | −0.0062 | 0.0004 | 0.0005 |
| 680 nm | 0.0060 | 0.0085 | 0.0017 | 0.0080 | 0.0082 | −0.0002 | 0.0023 | −0.0045 | 0.0018 | 0.0020 |
| 690 nm | 0.0052 | 0.0085 | 0.0065 | 0.0080 | 0.0082 | −0.0002 | 0.0031 | 0.0011 | 0.0026 | 0.0028 |
| 700 nm | 0.0043 | 0.0084 | 0.0113 | 0.0080 | 0.0082 | −0.0002 | 0.0039 | 0.0068 | 0.0035 | 0.0037 |

Figure 11:
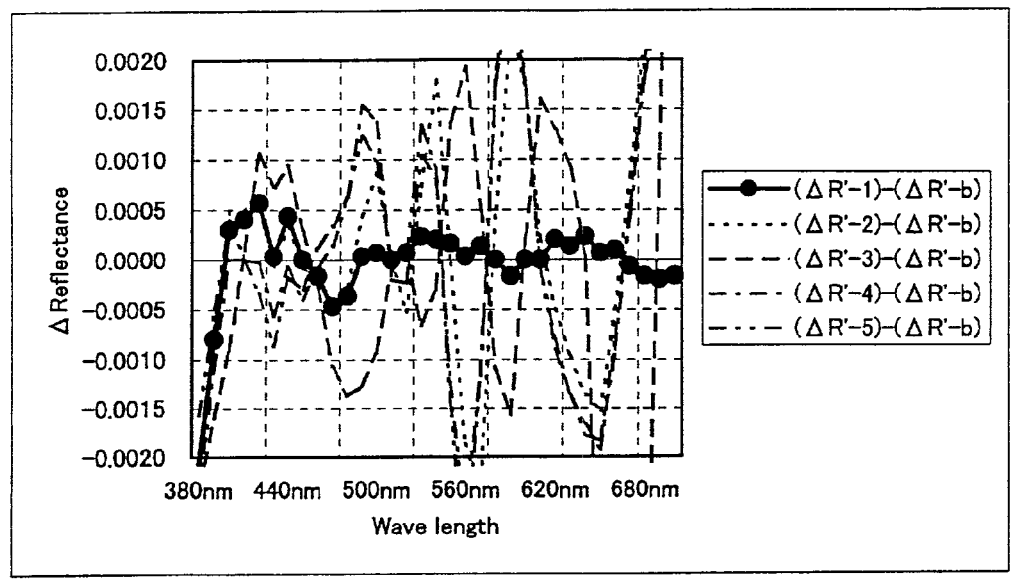
FIG. 11 is a view showing the difference of the difference ($\Delta R'-m-\Delta R'-b$)

As apparent from FIG. 11, it can be seen that ΔR'-1 is the most coincidental with ΔR'-b. In addition, the formulation of ΔR'-1 is shown in Table 15 (in Table 15, the formulation of ΔR'-1 indicates "A-b/automatic"). As apparent from Table 15, it was confirmed that the calculated error rate is extremely coincidental with the actual error rate.

TABLE 15

|  | A-std | A-b | ΔR'-1 A-b/auto |  |
|---|---|---|---|---|
| PVC resin Compound |  |  |  | Error rate |
| EP-4050 (White) | 50.0000 | 50.0000 | 50.0000 |  |
|  | 0.8485 | 0.8485 | 0.8481 | −0.14% |
| P-4710 (Black) | 0.0540 | 0.0540 | 0.0536 | 0.55% |
| P-4172 (Red) | 0.0257 | 0.0257 | 0.0260 | −1.36% |
| P-4420 (Yellow) | 0.0718 | 0.0718 | 0.0703 | 1.90% |
| P-4510 (Green) | — | 0.0020 | 0.0021 | −5.20% |
| sum. | 1.0000 | 1.0020 | 1.0001 |  |

Comparative Example

Figure 12:
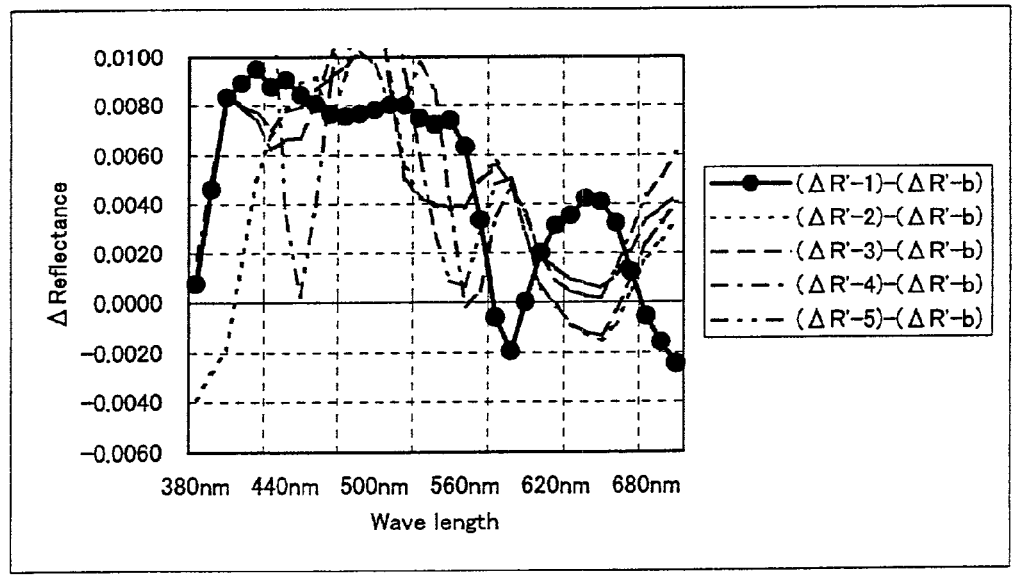
FIG. 12 is a view showing the difference of the difference ($\Delta R'-L-\Delta R'-b$) in Comparative Example, respectively.

A target was set at RST-b, CCM database with 20 kinds of coloring agents registered therein was used, 5 kinds having the high coincidental rate of spectral reflectance with that of a target sample were picked up, RPR-L thereof was calculated, and the difference ΔR'-L to RPR-b calculated from the regular formulation was obtained. Further, the difference between ΔR'-L and ΔR'-b was obtained. The results are shown in FIG. 12. As apparent from FIG. 12, it can be seen that ΔR'-1 can not be specified as being the closest to ΔR'-b, and is not remarkably different from ΔR'-2, ΔR'-3, ΔR'-4 and ΔR'-5.

INDUSTRIAL APPLICABILITY

According to the first invention, by displaying the actually measured color difference and the reproducibility for a sample produced in toning such as CCM toning and visual toning, it becomes possible to rapidly and simply determine whether toning work should be continued or not. According to the second invention, in the reproducibility evaluating method, an abnormal sample can be extracted and, at the same time, coloring agent for its error can be presumed and its amount can be presumed, leading to investigation of the abnormal cause.

What is claimed is:

1. A method for evaluating a reproducibility of a toning sample by CCM, wherein two or more samples are produced in a CCM toning or visual toning process by which colors are adapted to a target color and respective components are registered in a CCM system, comprising:
   evaluating the reproducibility of the samples based on a difference of spectral reflectance ΔR-n, wherein n denotes a sample number, between spectral reflectance RST-n obtained by measuring the respective samples and spectral reflectance RPR-n obtained by a CCM simulation corresponding to a coloring agent recipe for the sample at a same n;
   wherein the evaluating is performed based on a difference of color specification value ΔL*a*b* corresponding to the difference ΔR-n or a difference of spectral transmittance ΔT-n, a statistical value including at least one of a maximum, minimum or a standard deviation of the difference of color specification value and a color difference as well as the color difference calculated from the statistical value.

2. A method for evaluating the reproducibility of a toning sample by CCM, which comprises incorporating the method for evaluating the reproducibility of a toning sample as defined in claim 1 into a CCM software and calculating the coloring agent recipe by CCM system and, thereby, the reproducibility can be confirmed.

3. A method for evaluating a toning sample, wherein two or more samples are produced in a CCM toning or visual toning process by which colors are adapted to a target color and respective components are registered in a CCM system, comprising:
   evaluating a reproducibility of the samples based on a difference ΔR-n, wherein n denotes a sample number, between spectral reflectance RST-n obtained by measuring the respective samples and spectral reflectance RPR-n obtained by a CCM simulation corresponding to a coloring agent recipes for the sample at a same n, comprising the steps of:
   extracting a sample indicating an abnormal value ΔR-b, wherein b denotes a bad value, different from others among ΔR-n of sample groups; and
   choosing at least one of a coloring agent component mixed in the sample indicating the abnormal value or estimating a mixed amount of the coloring agent component, said estimating including the steps of:

calculating either of n except for b among the ΔR−n or an average of ΔR−n except for b, wherein the measured spectral reflectance of a sample indicating the abnormal value is RST−b and spectral reflectance obtained by CCM simulation corresponding to the coloring agent recipe is RPR−b;

adding a calculated value obtained in said calculating to spectral reflectance RPR−b by CCM system to obtain a corrected provisional true value RST'−b;

determining a difference ΔR'−b between a provisional true value RST'−b and a measured spectral reflectance RST−b;

using the measured spectral reflectance RST−b minus ΔR−ave as a corrected target color, obtaining spectral reflectance RPR−m obtained by simulation from an existing CCM data for toning to the corrected target color, and obtaining the difference ΔR−m between the spectral reflectance RPR−m and the simulated spectral reflectance RPR−b by CCM system; and determining a difference ΔR−m so that the difference between the ΔR'−b and the difference ΔR−m becomes minimum;

wherein a difference of color specification value or color difference obtained based on the difference ΔR−n is used in place of the difference ΔR−n.

4. A method for evaluating a reproducibility of a toning sample by CCM, wherein two or more samples are produced in a CCM toning or visual toning process by which colors are adapted to a target color and respective components are registered in a CCM system, comprising:

evaluating the reproducibility of the samples based on a difference of spectral transmittance ΔT−n, wherein n denotes a sample number, between spectral transmittance TST−n obtained by measuring the respective samples and spectral transmittance TPR−n obtained by a CCM simulation corresponding to a coloring agent recipe for the sample at a same n;

wherein the evaluating is performed based on a difference of color specification value ΔL*a*b* corresponding to a difference of spectral reflectance ΔR−n or the difference ΔT−n, a statistical value including at least one of a maximum, minimum or a standard deviation of the difference of color specification value and a color difference as well as the color difference calculated from the statistical value.

5. A method for evaluating a reproducibility of a toning sample by CCM, which comprises incorporating the method for evaluating the reproducibility of a toning sample as defined in claim 4 into a CCM software and calculating the coloring agent recipe by CCM system and, thereby, the reproducibility can be confirmed.

6. A method for evaluating a reproducibility of a toning sample by CCM, wherein two or more samples are produced in a CCM toning or visual toning process by which colors are adapted to a target color and respective components are registered in a CCM system, comprising:

evaluating the reproducibility of the samples based on a difference of spectral reflectance ΔR−n, wherein n denotes a sample number, between spectral reflectance RST−n obtained by measuring the respective samples and spectral reflectance RPR−n obtained by a CCM simulation corresponding to a coloring agent recipe for the sample at a same n;

wherein the evaluating the reproducibility of the samples is performed from the difference between either of n for ΔR−n, or an average for ΔR−n and the ΔR−n; and wherein the evaluating is performed based on a difference of color specification value ΔL*a*b* corresponding to the difference ΔR−n or a difference of spectral transmittance ΔT−n a statistical value including at least one of a maximum, minimum or standard deviation of the difference of color specification value and a color difference as well as the color difference calculated from the statistical value.

7. A method for evaluating the reproducibility of a toning sample by CCM, which comprises incorporating the method for evaluating the reproducibility of a toning sample as defined in claim 6 into a CCM software and calculating the coloring agent recipe by CCM system and, thereby, the reproducibility can be confirmed.

8. A method for evaluating a reproducibility of a toning sample by CCM according to claim 4, wherein two or more samples are produced in a CCM toning or visual toning process by which colors are adapted to a target color and respective components are registered in a CCM system, comprising:

evaluating the reproducibility of the samples based on a difference of spectral transmittance ΔT−n, wherein n denotes a sample number, between spectral transmittance TST−n obtained by measuring the respective samples and spectral transmittance TPR−n obtained by a CCM simulation corresponding to a coloring agent recipe for the sample at a same n;

wherein the evaluating the reproducibility of the samples is performed from the difference between either of n for ΔT−n, or an average for ΔT−n and the ΔT−n; and wherein the evaluating is performed based on the difference of color specification value ΔL*a*b* corresponding to a difference of spectral reflectance ΔR−n or the difference ΔT−n, a statistical value including at least one of a maximum, minimum or standard deviation of the difference of color specification value and a color difference as well as the color difference calculated from the statistical value.

9. A method for evaluating the reproducibility of a toning sample by CCM, which comprises incorporating the method for evaluating the reproducibility of a toning sample as defined in claim 8 into a CCM software and calculating the coloring agent recipe by CCM system and, thereby, the reproducibility can be confirmed.

10. A method for evaluating a toning sample, wherein two or more samples are produced in a CCM toning or visual toning process by which colors are adapted to a target color and respective components are registered in a CCM system, comprising:

evaluating a reproducibility of the samples based on a difference ΔT−n, wherein n denotes a sample number, between spectral transmittance TST−n obtained by measuring the respective samples and spectral transmittance TPR−n obtained by a CCM simulation corresponding to a coloring agent recipes for the sample at a same n, comprising the steps of:

extracting a sample indicating an abnormal value ΔT−b, wherein b denotes a bad value, different from others among ΔT−n of a sample groups; and choosing at least one of a coloring agent component mixed in the sample indicating the abnormal value or estimating a mixed amount of the coloring agent component, said estimating including the steps of:

calculating either of n except for b among the ΔT−n or an average of ΔT−n except for b, wherein the measured spectral transmittance of a sample indicating the abnormal value is TST−b and spectral transmittance obtained by CCM simulation corresponding to the coloring agent recipe is TPR–b;

adding a calculated value obtained in said calculating to spectral transmittance TPR–b by CCM system to obtain a corrected provisional true value TST'–b;

determining a difference ΔT'–b between a provisional true value ΔTST'–b and a measured spectral transmittance ΔTST–b;

using the measured spectral transmittance ΔTST–b minus ΔT–ave as a corrected target color, obtaining spectral transmittance TPR–m obtained by simulation from an existing CCM data for toning to the corrected target color, and obtaining the difference ΔT–m between the spectral transmittance TPR–m and the simulated spectral transmittance TPR–b by CCM system; and determining a difference ΔT–m so that the difference between the ΔT'–b and the difference ΔT–m becomes minimum;

wherein a difference of color specification value or color difference obtained based on the difference ΔT–n is used in place of the difference ΔT–n.

* * * * *